Dec. 10, 1957    W. D. LEWIS    2,816,270
MICROWAVE CHANNEL DROPPING FILTER PAIRS
Filed June 26, 1951    15 Sheets-Sheet 1

INVENTOR
W. D. LEWIS
BY
H. O. Wright
ATTORNEY

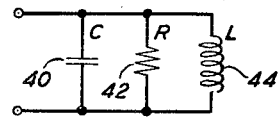
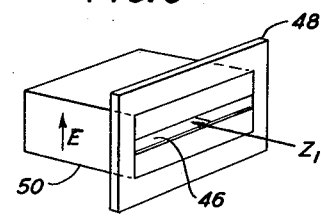
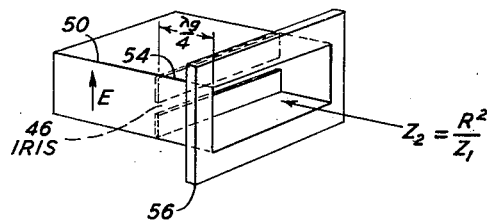
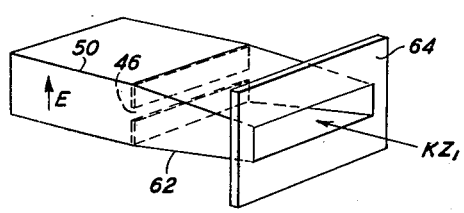
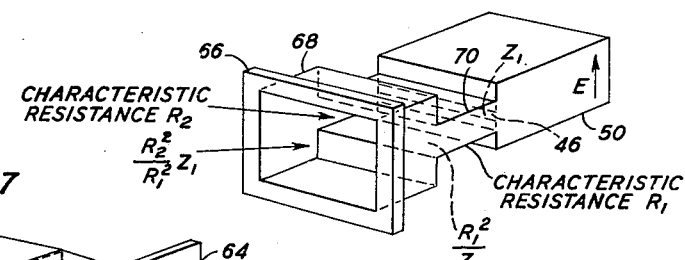
INVENTOR
W. D. LEWIS
BY
*H. O. Wright*
ATTORNEY Dec. 10, 1957    W. D. LEWIS    2,816,270
MICROWAVE CHANNEL DROPPING FILTER PAIRS
Filed June 26, 1951    15 Sheets-Sheet 3
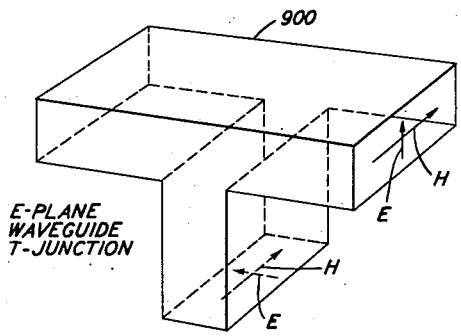
FIG. 9
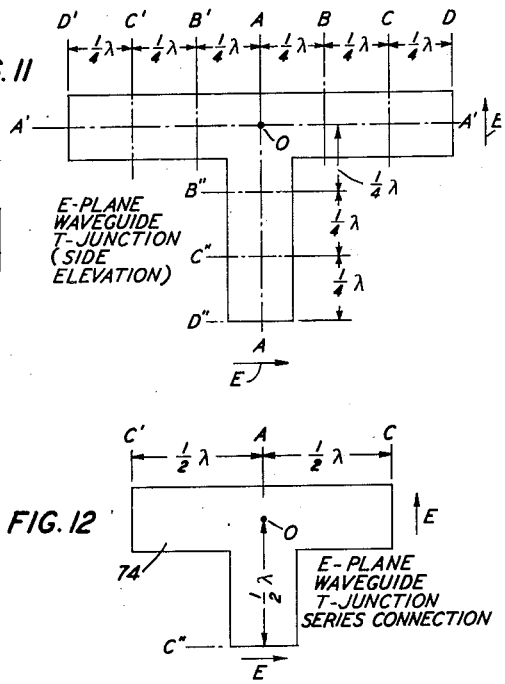
FIG. 11
FIG. 12
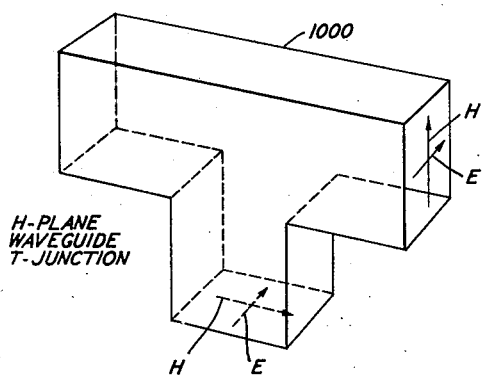
FIG. 10
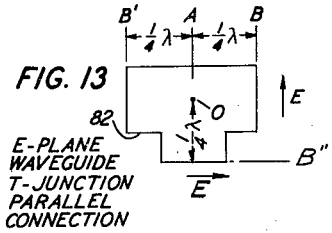
FIG. 13
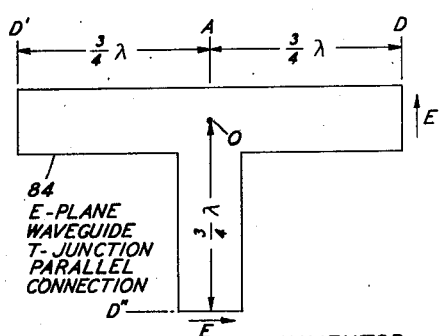
FIG. 14
INVENTOR
W. D. LEWIS
BY
H. O. Wright
ATTORNEY Dec. 10, 1957  W. D. LEWIS  2,816,270
MICROWAVE CHANNEL DROPPING FILTER PAIRS
Filed June 26, 1951  15 Sheets-Sheet 4

INVENTOR
W. D. LEWIS
BY
H. O. Wright
ATTORNEY

Dec. 10, 1957  W. D. LEWIS  2,816,270
MICROWAVE CHANNEL DROPPING FILTER PAIRS
Filed June 26, 1951  15 Sheets-Sheet 5

INVENTOR
*W. D. LEWIS*
BY
*H. O. Wright*
ATTORNEY

Dec. 10, 1957 W. D. LEWIS 2,816,270
MICROWAVE CHANNEL DROPPING FILTER PAIRS
Filed June 26, 1951 15 Sheets-Sheet 7

INVENTOR
W. D. LEWIS
BY
H. O. Wright
ATTORNEY

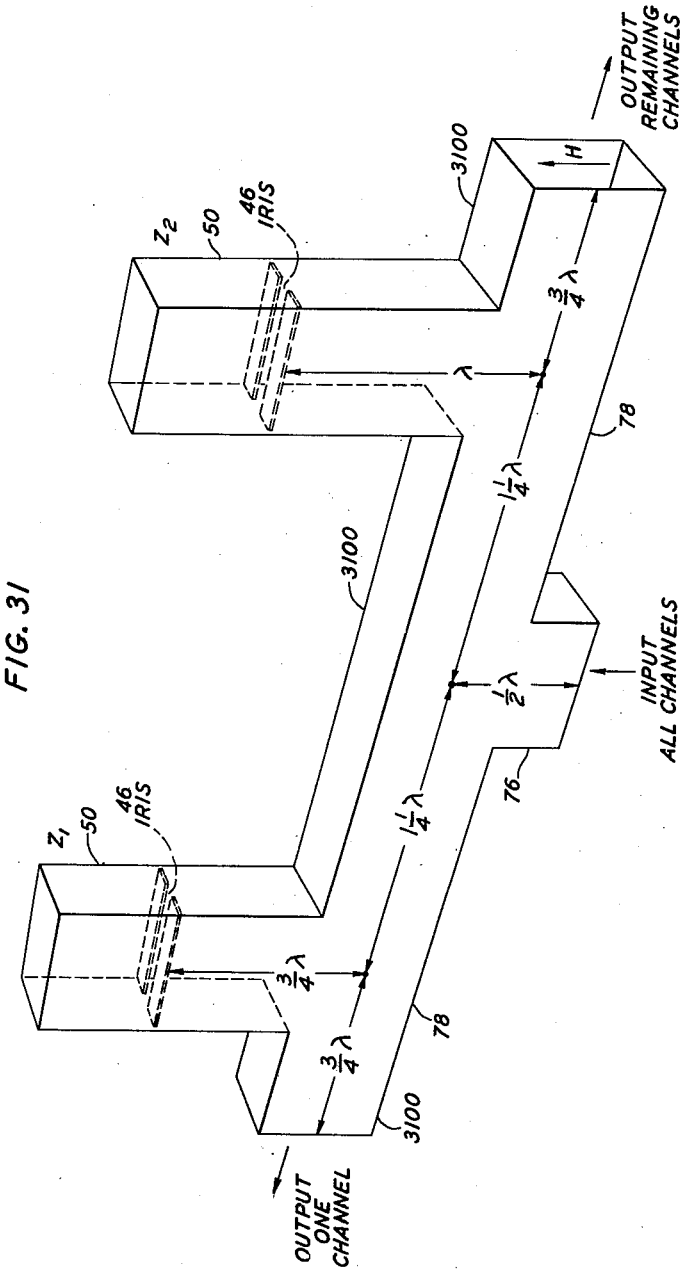

Dec. 10, 1957  W. D. LEWIS  2,816,270
MICROWAVE CHANNEL DROPPING FILTER PAIRS
Filed June 26, 1951  15 Sheets-Sheet 9
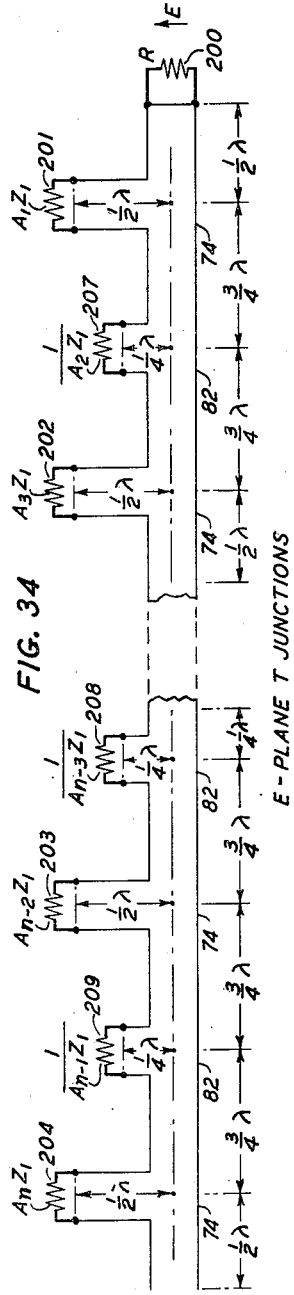
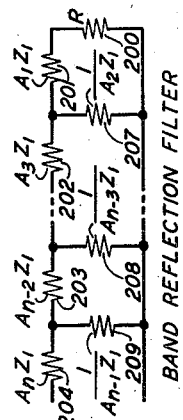
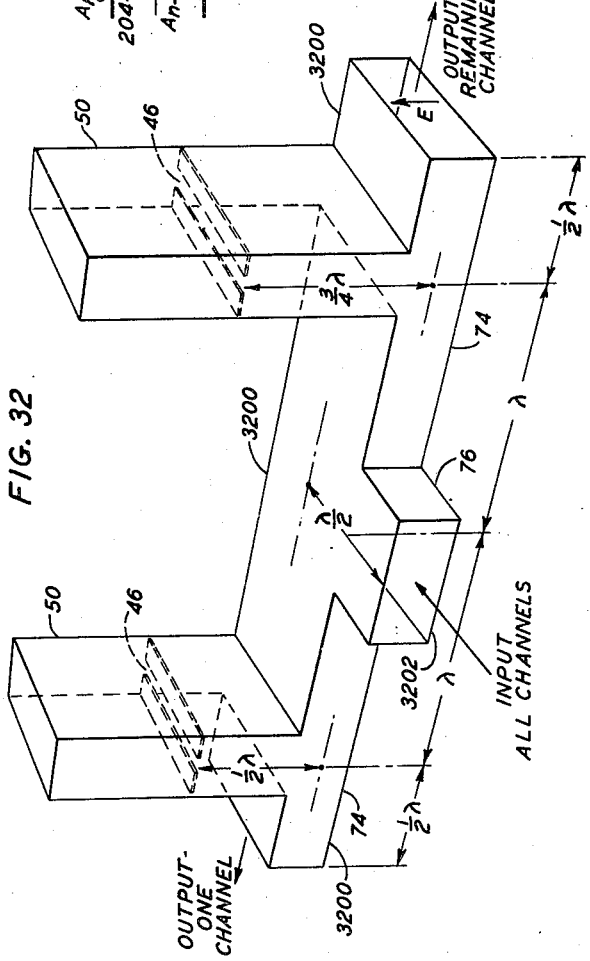
INVENTOR
W. D. LEWIS
BY
H. O. Wright
ATTORNEY

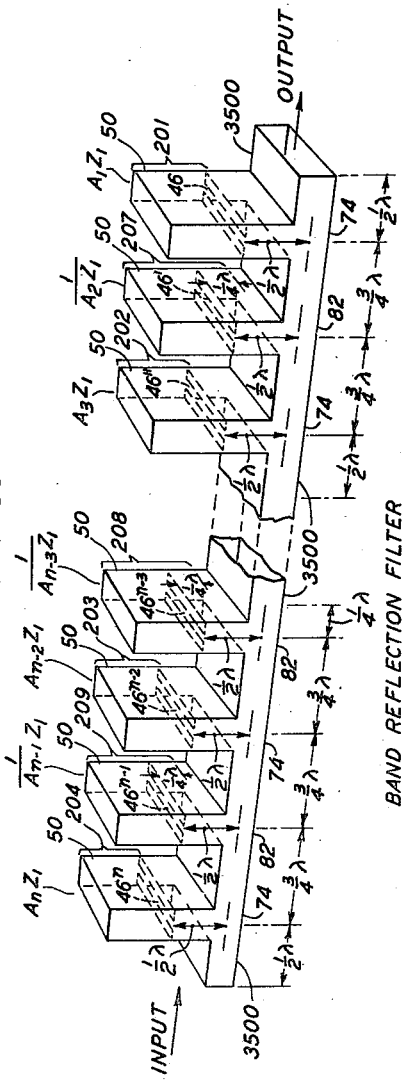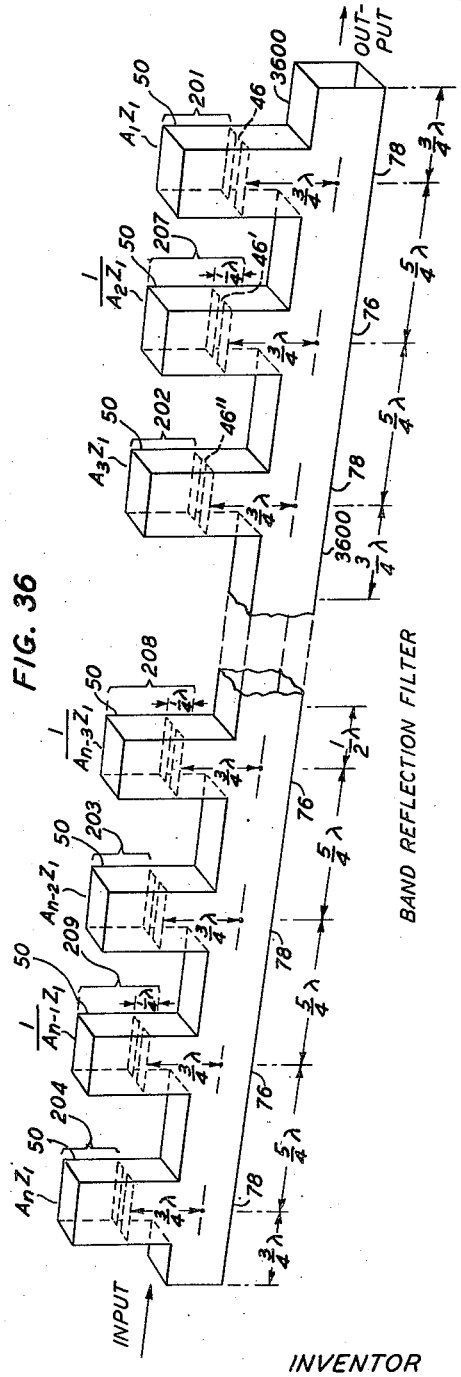

Dec. 10, 1957 W. D. LEWIS 2,816,270
MICROWAVE CHANNEL DROPPING FILTER PAIRS
Filed June 26, 1951 15 Sheets-Sheet 11
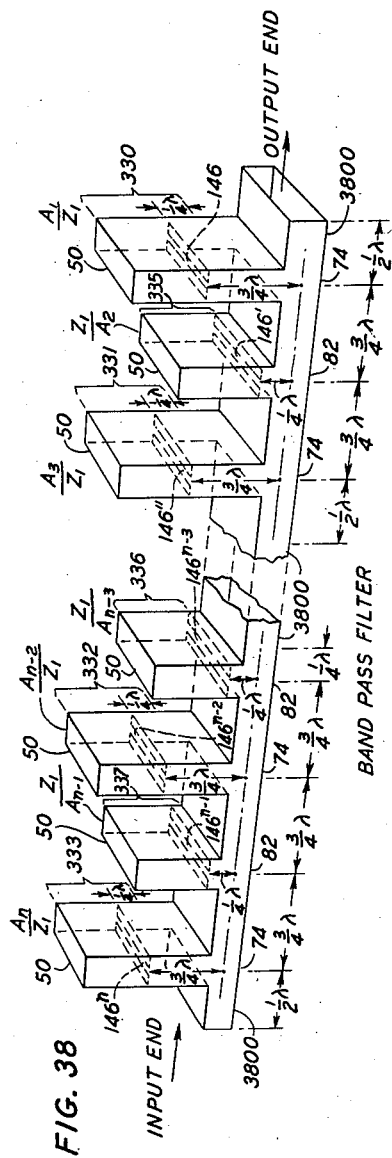
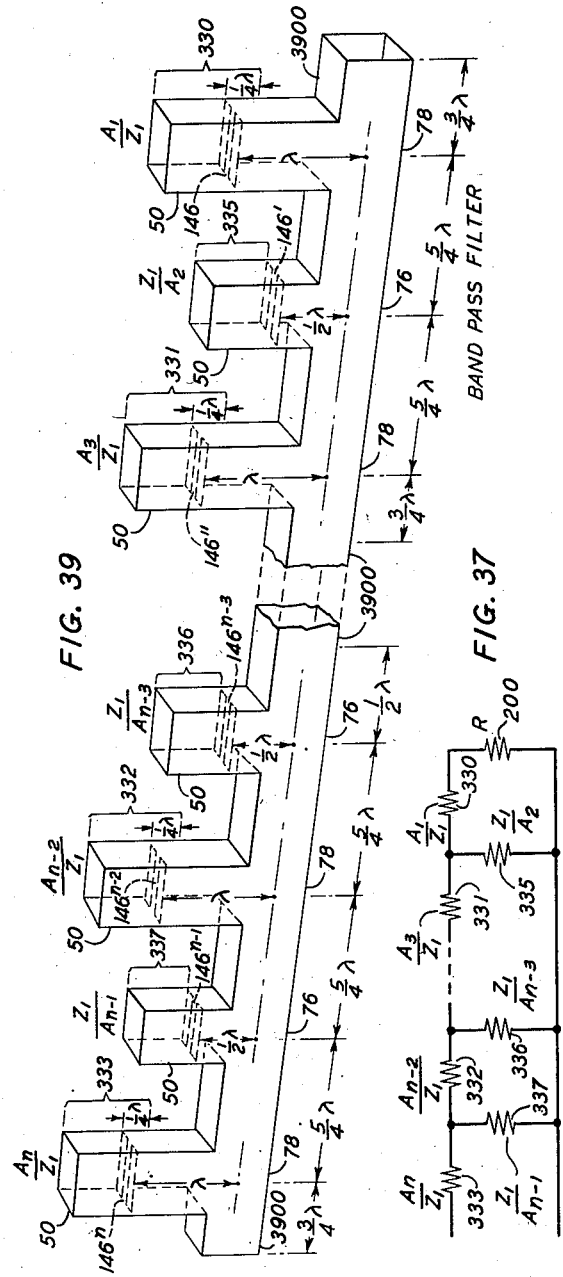
INVENTOR
W. D. LEWIS
BY
H. O. Wright
ATTORNEY Dec. 10, 1957  W. D. LEWIS  2,816,270
MICROWAVE CHANNEL DROPPING FILTER PAIRS
Filed June 26, 1951  15 Sheets-Sheet 12
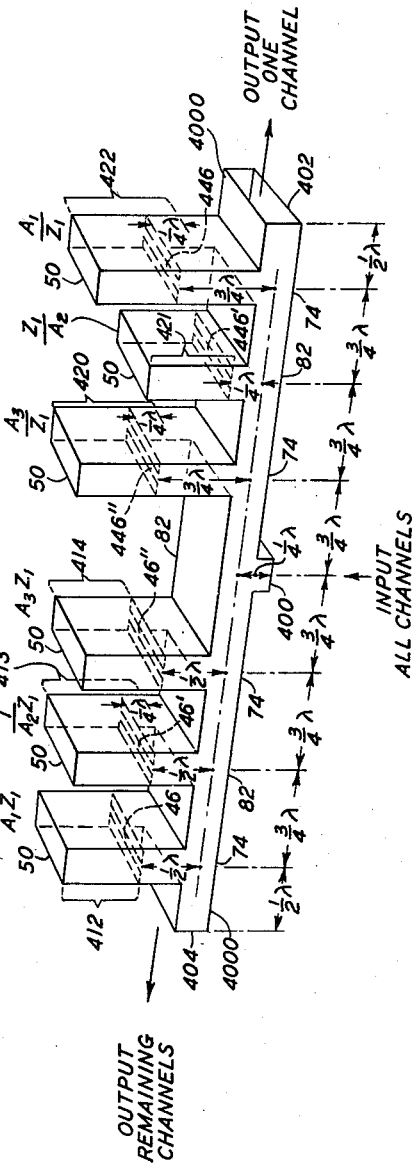
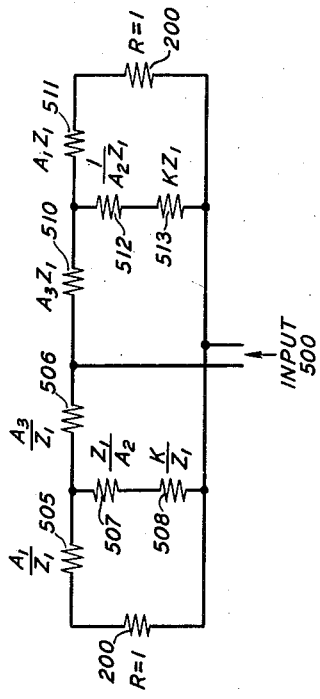
INVENTOR
W. D. LEWIS
BY
H. O. Wright
ATTORNEY Dec. 10, 1957 W. D. LEWIS 2,816,270
MICROWAVE CHANNEL DROPPING FILTER PAIRS
Filed June 26, 1951 15 Sheets-Sheet 13
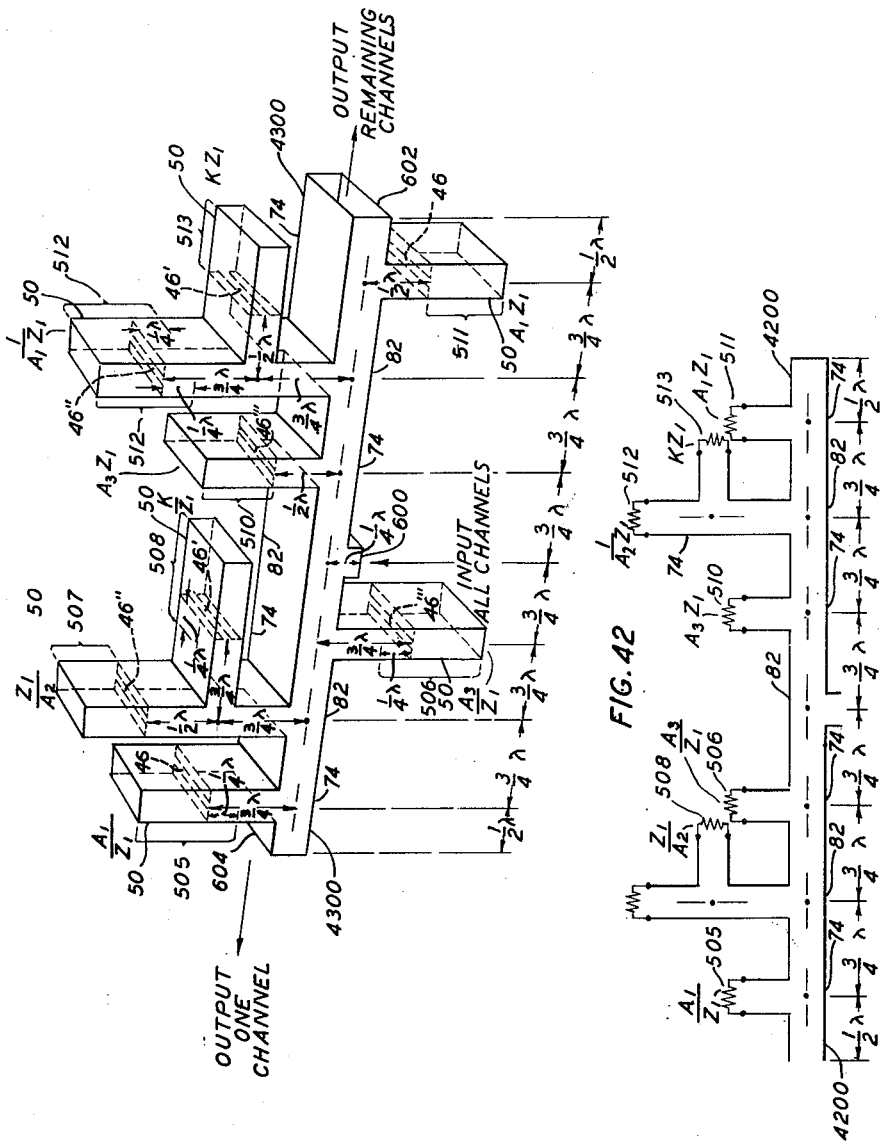
*INVENTOR*
*W. D. LEWIS*
BY
*H. O. Wright*
ATTORNEY Dec. 10, 1957  W. D. LEWIS  2,816,270
MICROWAVE CHANNEL DROPPING FILTER PAIRS
Filed June 26, 1951  15 Sheets-Sheet 14

COAXIAL LINE RESONATOR

IRIS FOR COAXIAL LINE RESONATOR

IRIS FOR COAXIAL LINE RESONATOR

IRIS FOR COAXIAL LINE RESONATOR

INVENTOR
W. D. LEWIS
BY
H. O. Wright
ATTORNEY

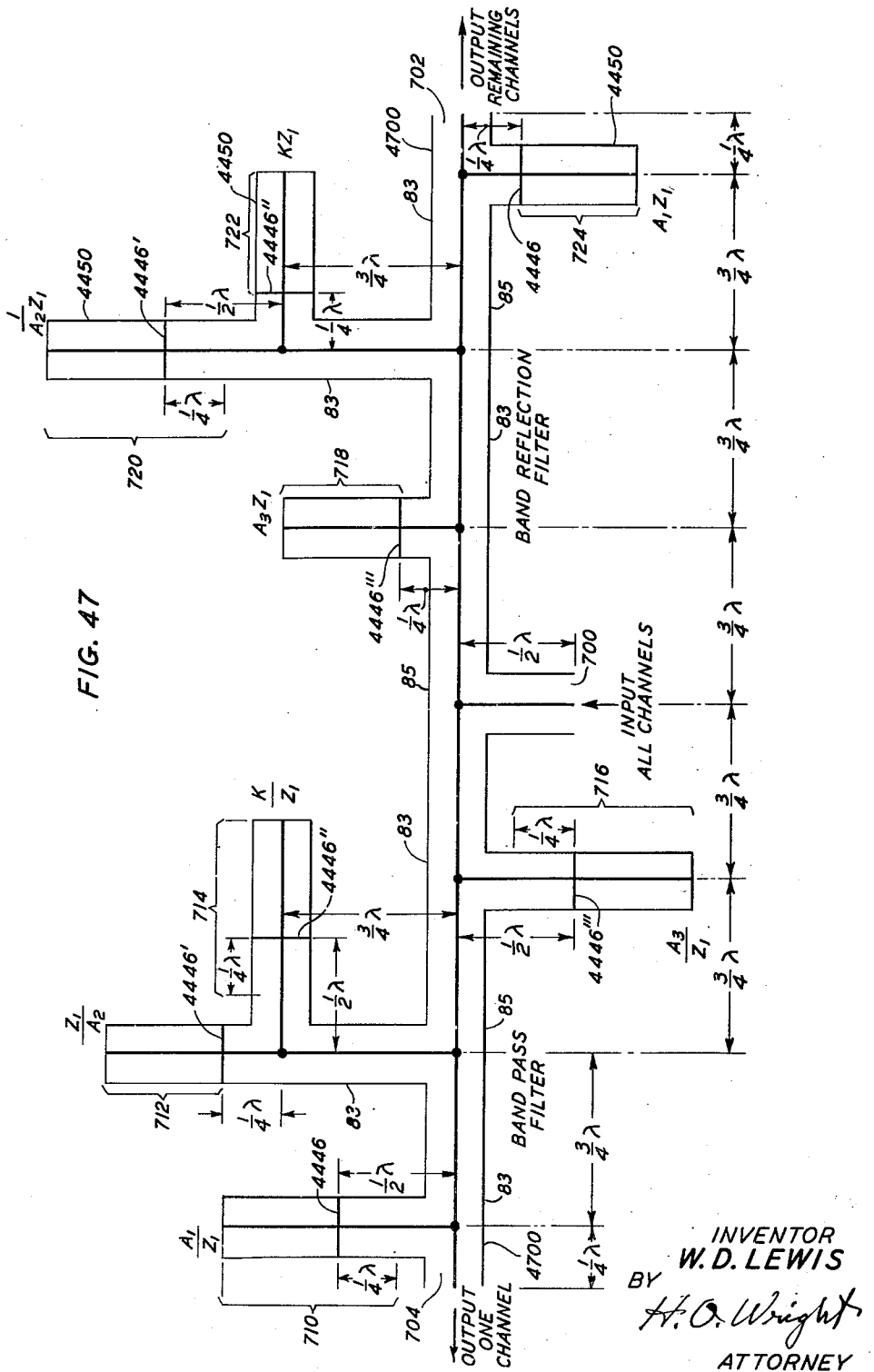

United States Patent Office 2,816,270
Patented Dec. 10, 1957

2,816,270

MICROWAVE CHANNEL DROPPING FILTER PAIRS

Willard D. Lewis, Little Silver, N. J., assignor to Bell Telephone Laboratories, Incorporated, New York, N. Y., a corporation of New York Application June 26, 1951, Serial No. 233,527

20 Claims. (Cl. 333—9)

This invention relates to very high frequency (or microwave), electromagnetic wave, channel-dropping, or segregating, circuit arrangements. More particularly, it relates to circuits employing "shielded-type transmission lines" and to wave-guide and coaxial line transmission line filters and complementary filter pairs, for use therewith, which offer practical solutions to the problems of dropping, or segregating, particular predetermined frequency bands (or channels) from a shielded-type transmission line along which a plurality of frequency bands (or channels) are being transmitted.

The term "shielded-type transmission line" is, for the purposes of this application, to be understood to apply to both coaxial transmission lines and wave-guide transmission lines, both types being well known to those skilled in the art.

The principal object of the invention is to provide wave-guide or coaxial line circuits which will function at very high frequencies in a manner analogous to the functioning at voice and ordinary carrier frequencies of particular types of prior art "low frequency" circuits employing so-called "lumped-elements," which last-mentioned term is understood in the art to include conventional, low frequency, inductance coils, condensers, resistances and the like. At very high frequencies it becomes impracticable to attempt to use "lumped-elements." This is so for a number of reasons, several of which, for example, are that their physical dimensions become microscopic and that "parasitic" effects, particularly distributed capacities, render it practically impossible to obtain discrete lumped impedances.

A further particular object of the invention is to provide microwave channel-dropping, shielded-type transmission line, circuits which present a substantially constant resistive impedance over the entire operating frequency range of a very high frequency, or microwave, wide frequency band, intelligence transmission system.

An additional object is to provide a convenient and practical method of deriving shielded transmission line structures which are faithful very high frequency analogs of any low frequency, "lumped-element," ladder-type transducer.

Other and further objects will become apparent from the detailed description of a number of specific illustrative circuits and the components thereof, given hereinbelow, and from the appended claims.

In general, the major portion of the circuit arrangements shown in the accompanying drawings to illustrate the application of the principles of the present invention are in the nature of very high frequency analogs of constant resistive impedance, low frequency, "lumped-element," circuit arrangements such as those shown and described, by way of example, in United States Patent 2,076,248, granted on April 6, 1937 to E. L. Norton, and/or in E. L. Norton's paper entitled, "Constant Resistance Networks with Applications to Filter Groups" published in the Bell System Technical Journal for April 1937.

The arrangements of the invention will be more readily understood in connection with the detailed description of specific illustrative embodiments shown in the accompanying drawings, in which:

Fig. 4 is an electrical schematic diagram of a wave-guide component, freely used in wave-guide circuits of the invention;

Figure 22:
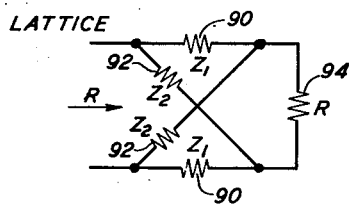
Figure 23:
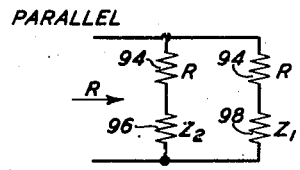
Figure 24:
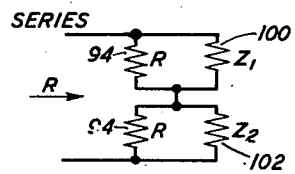
Figure 25:
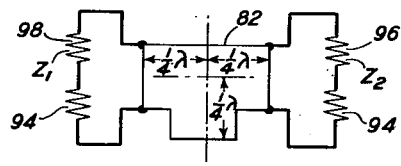
Figure 26:
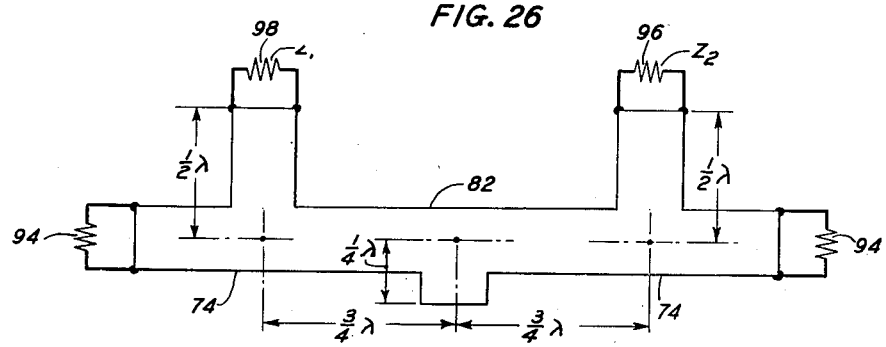
Figure 27:
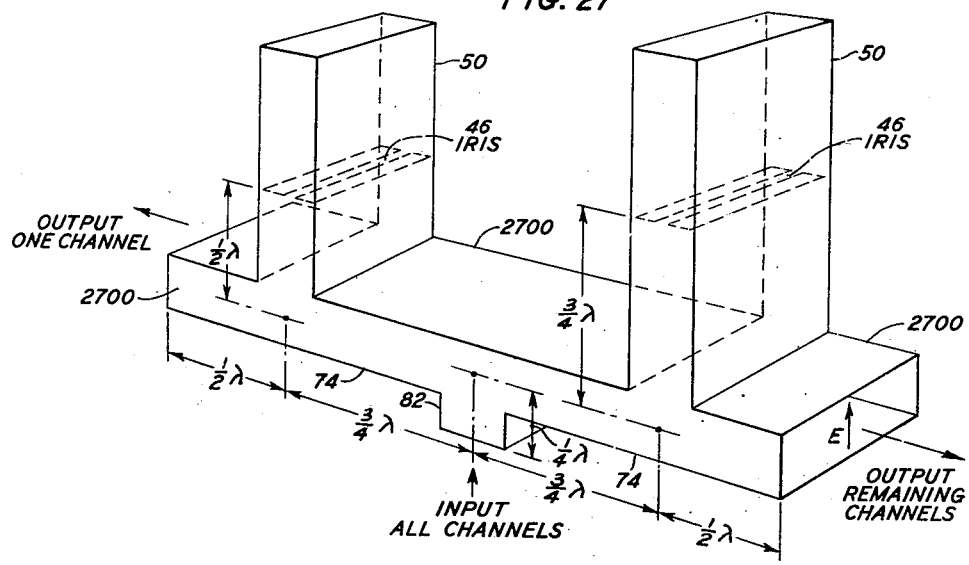
Figure 44A:
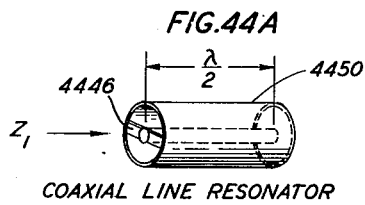

Figs. 5 to 21, inclusive, illustrate various types of wave-guide and coaxial transmission line components employed in circuit arrangements of the invention;

Figs. 22 to 24, inclusive, are electrical schematic diagrams employed in explaining the constant-resistance features of certain circuit arrangements of the invention;

Figs. 25 to 27, inclusive, illustrate the derivation of one simple specific embodiment of a constant-resistance, channel-dropping, filtering circuit of the invention, employing wave-guide components;

Figs. 28 to 32, inclusive, illustrate the derivation of other simple specific embodiments similar to that derived in Figs. 25 to 27, inclusive;

Figs. 33 to 40, inclusive, are illustrative of the derivation of a more complex specific embodiment of a constant-resistance, channel-dropping, filtering circuit of the invention, employing wave-guide components;

Figs. 41 to 43, inclusive, illustrate the derivation of a still more complex specific embodiment of a constant-resistance, channel-dropping, filtering circuit of the invention, employing wave-guide components; and Figs. 44a, b, c and d to 47, inclusive, illustrate the application of the principles of the invention to the construction of coaxial transmission line, constant-resistance, channel-dropping, or segregating, filters.

Figure 1:
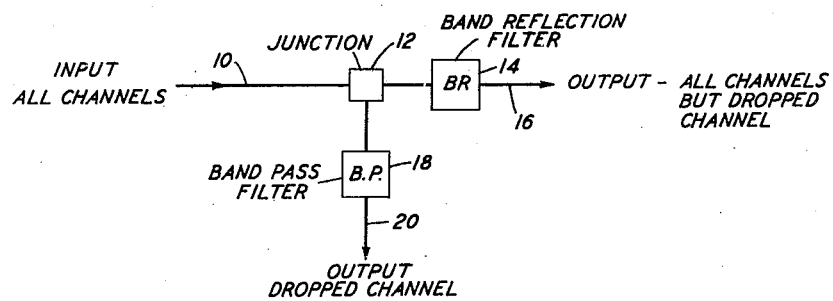
Figs. 1 and 2 are block schematic diagrams of illustrative circuit arrangements of the invention.

In more detail, the block schematic diagram of Fig. 1 represents a basic unit circuit configuration which, in accordance with principles to be explained below, offers a practicable solution to the problem, encountered, in systems employing shielded-type transmission lines, of segregating the individual communication channels of a multichannel very high frequency (commonly referred to as "microwave") system from a main transmission line, without interfering with or degrading the transmission of the remainder of the channels being transmitted along the line.

An alternate solution to this same fundamental problem is disclosed in my United States Patent 2,531,447, granted November 28, 1950, for "Hybrid Channel-Branching Microwave Filters." As is evident from a comparison of the circuits of my patent with that of Fig. 1, the latter is fundamentally more simple and is substantially more economical since it requires less than half the number of component parts.

In the circuit of Fig. 1, a main transmission line 10, over which a plurality of very high frequency intelligence bearing channels (or bands of frequencies carrying distinct and independent intelligence signals, such as television video signals, or the like), is being transmitted, is brought to a junction 12, specific preferred forms of which will be discussed and described in detail hereinunder. Also connected to junction 12 are a band reflection filter 14 and a band-pass filter 18, a number of specific preferred forms of which will also be disclosed and described in detail hereinunder. Filter 18 passes the single channel or band of frequencies to be dropped, branched or segregated from the main line 10, the single channel only, appearing on output transmission line 20. Filter 14 passes all channels, except the one to be dropped, to the output transmission line 16, as indicated.

This particular combination of filters, as described briefly above, offers the further very real advantage that, as is well known in the art, because they are complementary to each other, i. e., one reflects the same frequency band which is passed by the other, the common junction point at which they connect with each other and with line 10 can be made to have at least a substantially constant resistive impedance over a broad range of frequencies. For specific structures, to be described in detail below, the design of which is based upon rigorously derived constant-resistance formulae, a very close approximation to constant-resistance structures over broad frequency regions can be attained.

It is highly desirable, of course, in order to simplify the problem of properly matching impedances in any specific system, that the impedance at each junction point be substantially constant, purely resistive, impedance over the entire range of frequencies covered by all channels to be transmitted over the main transmission line 10.

Figure 2:
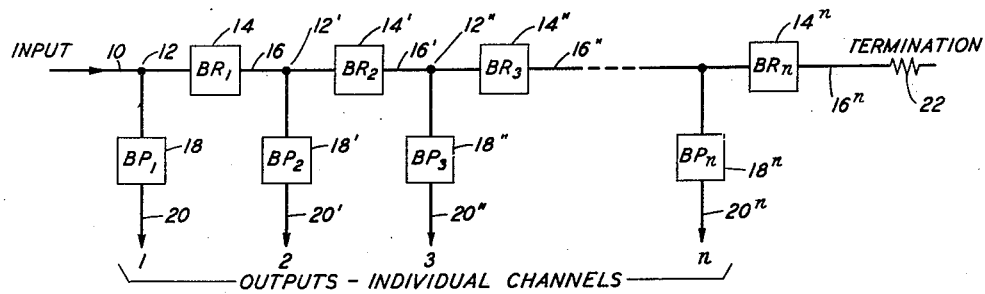

Any number of individual channels can be dropped from the main transmission line by a plurality of circuit arrangements of the type shown in Fig. 1 by simply connecting the circuits in cascade, or sequential order, as illustrated, for example, in Fig. 2. Each combination of a band reflection and a band-pass filter is, of course, designed to effect the dropping or segregating of a different one of the plurality of channels being transmitted along the main transmission line 10.

The first combination of Fig. 2 can be precisely as shown in Fig. 1, corresponding components of the two circuits bearing corresponding designation numbers. Subsequent combinations from left to right differ from the preceding ones only in dropping off a different channel, or frequency band, as described above. Corresponding components of subsequent combinations are given corresponding numbers, with prime marks added for the first subsequent combination, double prime marks added for the second subsequent combination and the exponent $n$ added for the $n$th subsequent combination, as shown in Fig. 2. Channels 1, 2, 3, . . . $n$ are thus dropped at successive output lines 20, 20', 20'', respectively, as indicated in Fig. 2, until all channels have been dropped. The output line $16^n$ of the last band rejection filter $14^n$ should be terminated in an impedance termination 22 which matches the output impedance of the filter. Alternatively, there may be cases in which only a portion of the total number of channels is to be branched off or dropped, as, for example, at an intermediate station between terminals of a "long-haul" transmission system, in which cases, after the proper channels have been branched off, the remainder continue on the main transmission line to another intermediate station or to a terminal of the system. In such cases the characteristic impedance of the main transmission line should match that of the output of the last band rejection filter employed. To facilitate the assembly of units in accordance with any of numerous arrangements which may be found desirable for particular repeater and/or terminal stations of a long radio relay microwave transmission system, for example, convenience usually dictates that a single standard type of coaxial line or wave-guide transmission line be employed and that all terminal impedances of all units employed in the system shall match the characteristic impedance of the transmission line employed. In the illustrative embodiments shown in the accompanying drawings, the constant purely resistive impedance R will ordinarily be the characteristic impedance of the transmission line with which the unit being described is to be used.

Figure 3:
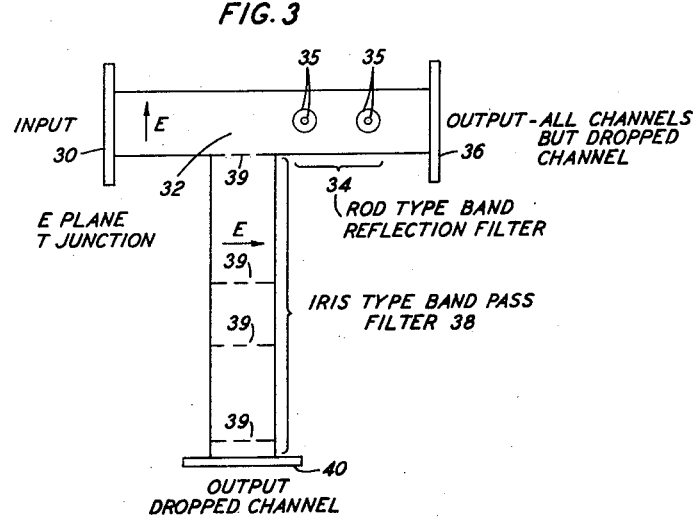
Fig. 3 is a simple specific embodiment of the invention employing wave-guide components.

The structure of Fig. 3 represents one specific type of wave-guide structure of the general character illustrated by the block diagram of Fig. 1.

In Fig. 3 an input wave guide 30 is joined to two output wave guides 36 and 40, respectively, by "E-plane T-junction" 32. The "E-plane T-junction" is shown in Figs. 9, 11, 12, 13 and 14 and will be described in detail below in connection with these figures. In the output arm 36, a band reflection filter 34, of the type disclosed and claimed in United States Patent 2,510,288, granted June 6, 1950 to L. C. Tillotson and applicant, jointly, is assembled, the circles 35 representing the two resonant rod and capacitor elements of the filter. In the output arm 40 a spaced, multiple iris, band-pass filter 38, of the type represented by filters 116 to 120, inclusive, of Fig. 22 of United States Patent 2,432,093, granted December 9, 1947 to A. G. Fox, is assembled, four irises 39 being employed, as shown. The filters are designed, as taught in their respective patents, so that the band of frequencies passed by filter 38 is identical with the band of frequencies reflected by filter 34.

Preparatory to a discussion of more complicated wave-guide and coaxial channel-dropping filters of the invention, a number of elements employed in such filters will next be described.

The electrical schematic diagram of Fig. 4, comprising a capacitor 40, an inductor 44 and a resistor 42 connected in parallel, represents an elementary, low frequency, "lumped-element," circuit which can be closely approximated at very high (microwave) frequencies by the structure of Fig. 5 comprising a simple cavity 50 provided with an iris 46 at its right end and closed at its left end as shown. Such a cavity can be conveniently formed from a section of wave guide having a length of substantially one-half wavelength, or any integral number of half wavelengths, of the frequency at which resonance is desired, the wavelength being that for the wave of the desired frequency when being propagated through a wave guide of the same cross-sectional dimensions and general physical characteristics, as that of which the cavity is constructed. As is well known to those skilled in the art, the frequency of resonance of the device of Fig. 5 is mainly determined by the cavity dimensions, and its band width (or impedance level) is largely determined by the size and shape of the iris. The resonant frequency and band width together determine the equivalent L and the equivalent C of the wave-guide circuit. The equivalent R is determined by the ohmic losses in the cavity and iris and in general decreases as the ratio of cavity volume to cavity surface area is increased. A flange 48 is commonly provided to facilitate mechanical assembly of the unit to other like, flanged, wave-guide, structural components. In general, however, in order to simplify the drawings, flanges will be omitted in the illustrative wave-guide filter structures shown.

Assuming that the device of Fig. 5 has, as indicated on the drawing, an impedance $Z_1$ as viewed from the right of the plane including the iris 46, the reciprocal $Z_2$ of this impedance can, in accordance with elementary transmission line theory, be readily obtained, as shown in Fig. 6, by simply adding a quarter wavelength (as measured in the guide) section of wave guide 54 at the right of iris 46. A flange 56 is commonly added to facilitate assembly with other wave-guide structures similarly equipped. The impedances $Z_1$ and $Z_2$ are said to be reciprocal when their product is equal to the square of the characteristic resistive impedance R of the wave-guide transmission line of which the quarter wavelength section is made, as indicated in Fig. 6.

In many of the filtering structures to be described in detail hereinunder, a plurality of devices of the types illustrated in Figs. 5 and 6, and described above, are required which, while having substantially the same variation with frequency, have differing absolute values. For example, devices having impedances of $K_1Z_1$, $K_2Z_1$, $K_3Z_1$ . . . $K_nZ_1$ are in many instances required, where $K_1$, $K_2$, $K_3$ . . . $K_n$ are constants of specific differing magnitudes.

Several methods of achieving the required differing absolute impedance values are available.

One convenient method, familiar to those skilled in the art, is the use of cavities of substantially the same overall dimensions but with irises having slightly different physical dimensions. While the proper iris size and shape can be mathematically computed for any particular impedance, the method is tedious, so that, as a practical matter, it is usually more expedient to start with an iris opening which is smaller than that which experience has indicated will be required and to gradually enlarge the iris and to measure the resulting changes in impedance until the correct impedance has been reached.

Another, applicable where every cross-sectional dimension perpendicular to the electric vector is the same, as in certain cavity and iris combinations, where the iris is an inductive rod or a rectangular plate, a change in the dimension of the rod or plate in the direction parallel to the direction of the E-vector will result in a proportional change in the impedance level.

Still another method comprises the use of any of a number of well known types of transmission line transformers, to transform any prototype of the required group of impedances into any other member of the group. This latter method is illustrated, by way of two specific examples, in Figs. 7 and 8.

In Fig. 7, the resonant cavity 50 and iris 46 combination of Fig. 5, having an impedance of $Z_1$ has added thereto a tapered section of transmission line 62, the taper and length of section 62 being chosen in accordance with principles well known in the art, so that the impedance $Z_1$ is transformed to $KZ_1$ at the right end of section 62, as indicated. In the majority of cases the length of section 62 will be one-half wavelength of the median frequency of the range over which operation is desired. A flange 64 is usually provided for the device of Fig. 7, as for the devices of Figs. 5 and 6.

In Fig. 8 the resonant cavity 50 and iris 46 combination of Fig. 5, having an impedance $Z_1$, has added thereto a stepped section of transmission line 68, 70, the portion 70 having a characteristic resistive impedance of $R_1$ and the portion 68 having a characteristic resistive impedance of $R_2$. Sections 68 and 70 are each one-quarter wavelength long of the median frequency of the operating frequency range. The impedance $Z_1$, of cavity 50 and iris 46, is transformed by section 70, at its left end, to $$\frac{(R_1)^2}{Z_1}$$

and this impedance is transformed by section 68 to $$\left(\frac{R_2}{R_1}\right)^2 Z_1$$

which is the impedance of the over-all device at the left end of section 68. A flange 66 can be provided to facilitate mechanical assembly with similar wave-guide components.

In Figs. 9 and 10 are shown perspective views of two types of wave-guide T-junctions which will be employed for various specific purposes to be described in more detail hereinafter.

As is well known to those skilled in the art, it is common to employ wave guides of rectangular cross-section in which one cross-sectional dimension is at least twice the other cross-sectional dimension, the larger dimension commonly being at least as large as a half wavelength and less than a full wavelength (as measured during transmission of the wave within the guide) of the lowest frequency with which it is to be used. The smaller cross-sectional dimension should not exceed one-quarter wavelength (as measured in the guide) and should preferably be somewhat less than one-quarter wavelength of the lowest frequency with which the wave guide is to be used. Such guides are then commonly employed to transmit a dominant mode wave (so-called $TE_{10}$) in which the plane of the electric vector of the wave, designated by an arrow labelled E, is parallel to the smaller cross-sectional dimension of the guide. The smaller cross-sectional dimension is, therefore, commonly designated as the "E-plane dimension" and the longer cross-sectional dimension is designated as the "H-plane dimension," the letter H being employed to indicate the magnetic vector of the wave which as indicated by the arrow designated H, is, for normal transmission of the dominant mode wave, at right angles to the plane of the electric vector and, therefore, parallel to the longer cross-sectional dimension of the guide.

The T-junction 900 of Fig. 9 is known as an E-plane T-junction since its T-shaped surfaces are parallel to the plane of the electric vector E.

Similarly, the T-junction 1000 of Fig. 10 is known as an H-plane T-junction since its T-shaped surfaces are parallel to the plane of the magnetic vector H.

The potentialities of the E-plane wave-guide T-junction, which is employed in filter structures of the invention, are illustrated by Figs. 11 to 14, inclusive.

In Fig. 11, the vertical center line or vertical axis, A—A and the horizontal center line, or longitudinal axis, A'—A' intersect at point O, which will be called the center point of the T-junction. One-quarter wavelength intervals, from center point O, along the longitudinal axis A'—A' are designated to the right by letters B, C and D and to the left by leters B', C' and D'. Similarly, one-quarter wavelength intervals, from center point O, downwardly along the vertical axis A—A are designated by the letters B", C" and D", as shown.

In general, the "yardstick" wavelength, by which distances, given in units of wavelength, are to be determined, is that corresponding to the median frequency of the band of frequencies (measured in the guide) with which the device under consideration is to be employed.

As pointed out in United States Patent 2,445,895, granted July 27, 1948 to W. A. Tyrrell, in connection with Figs. 2 and 3 of the patent, the E-plane wave-guide T-junction is normally considered as providing a series type electrical connection, so that, for example, if two impedances $Z_1$ and $Z_2$ are connected to the right and left arms of the junction, respectively, the impedance resulting at the lower end of the middle or vertical arm will be that of impedances $Z_1$ and $Z_2$ connected electrically in series.

However, where $Z_1$ and $Z_2$ do not match the characteristic impedance of the wave guide of which the T-junction is made, the above conclusion will only be valid provided all three arms are each effectively substantially one-half wavelength, or an integral number of half wavelengths, long, the length, in each instance, being measured from center point O along the axis of the arm to the plane at which the impedance is connected, or measured.

In actual practice, for any particular size of wave guide and median operating frequency, it may be found necessary to make the arms all slightly more, or slightly less, than one-half wavelength in order to obtain a precise series connection. The exact arm lengths, for T-junctions of the invention, are therefore determined by experiment for any particular wave-guide dimensions and median operating frequency and will be found to be substantially as set forth in this specification.

It should, perhaps, be noted here, that, as is well known to those skilled in the art, any length of uniform transmission line when terminated at one end by its characteristic impedance, will present an impedance identical to its characteristic impedance at its other end. Therefore, obviously, sections of transmission line which are terminated in their respective characteristic impedances can be of any convenient length. However, since relatively small deviations of the termination from the true characteristic impedance can introduce troublesome impedance irregularities, it is, perhaps, more sound as a general design practice to choose, when feasible, lengths which are likely to introduce minimum irregularities.

In Fig. 12, an E-plane T-junction 74 having all three arms substantially one-half wavelength long, as defined above, is shown and labelled as a "series connection." Thus, when two impedances are connected to any two of the three arms of the T-junction, respectively, the impedance at the third arm of the junction will be that of the two impedances connected electrically in series.

Applicant has discovered that a parallel type electrical connection can be provided by an E-plane wave-guide T-junction if all three arms of the junction are each made substantially one-quarter wavelength, or an odd number of quarter wavelengths, long, as illustrated, for example, by the junctions 82 and 84 of Figs. 13 and 14. The arms of junction 82 of Fig. 13 are, as shown, each substantially one-quarter wavelength long and those of junction 84 of Fig. 14 are, as shown, each substantially three-quarters of a wavelength long. In accordance with applicant's discovery, either the T-junction of Fig. 13 or that of Fig. 14 will provide a parallel type electrical coupling. Considerations of mechanical convenience and electrical stability will largely determine whether the junction of Fig. 13 or that of Fig. 14 is more suitable for use in any particular case. In general, a need for either less electrical interaction, or less mechanical crowding between adjacent resonators will in specific instances dictate the use of the junction of Fig. 14. Theoretically, the two junctions of Figs. 13 and 14 are precisely equivalent. The junction of Fig. 13 will be indicated in the attached drawings since its performance is normally acceptable.

In a similar manner the potentialities of the H-plane wave-guide T-junction are illustrated by Figs. 15 to 18, inclusive.

Figure 15:
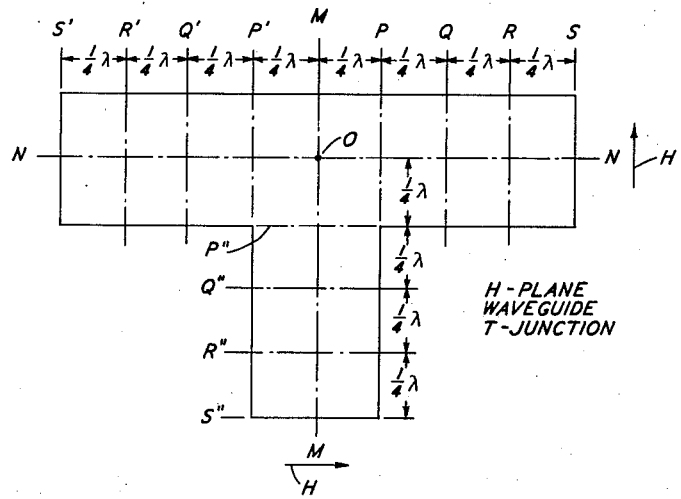
Figure 16:
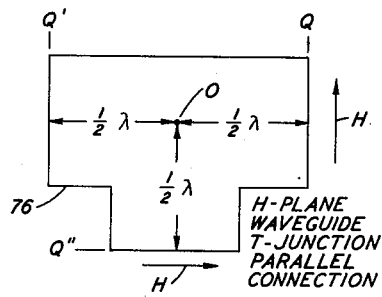
Figure 17:
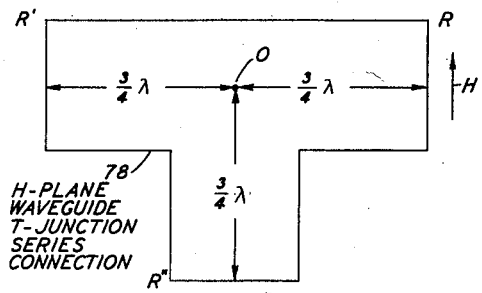
Figure 18:
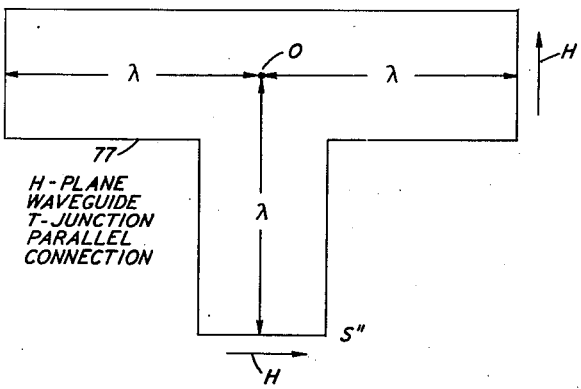

In Fig. 15 the vertical center line, or vertical axis M—M and the horizontal center line, or horizontal axis, N—N intersect at the center point O of the T-junction. One-quarter wavelength intervals, from center point O, along the longitudinal axis N—N are designated, to the right, by letters P, Q, R and S, and, to the left, by letters P', Q', R' and S'. Similarly, one-quarter wavelength intervals from center point O, downwardly along vertical axis M—M are designated by the letters P'', Q'', R'' and S'', as shown.

As for the E-plane junction described above, the normal parallel type electrical connection provided by the H-plane T-junction is valid only if all three arms are each substantially one-half wavelength, or an integral number of half wavelengths, long. Accordingly, junctions 76 and 77 of Figs. 16 and 18, respectively, will provide parallel type electrical connections, whereas H-plane wave-guide T-junctions 78 of Fig. 17, having its three arms each substantially three-quarters of a wavelength long, will provide a series type electrical connection.

Figure 19:
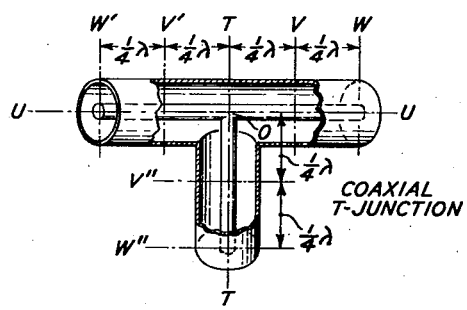
Figure 20:
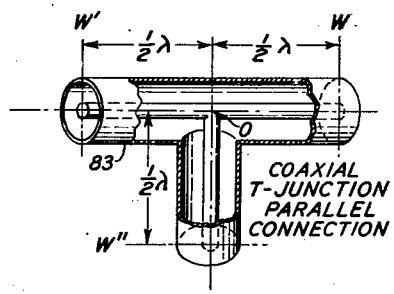
Figure 21:
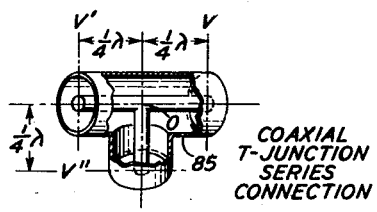

In analogous manner, the potentialities of the coaxial transmission line T-junction are illustrated by Figs. 19 to 21, inclusive.

In Fig. 19 the vertical center line, or axis, T—T intersects the horizontal center line, or axis, U—U at the center point O of the junction. Letters V, W, V', W' and V'', W'' indicate quarter wavelength intervals along the respective axes from point O as shown.

Where, as in Fig. 20, the three arms are each substantially an integral number of half wavelengths long, the junction 83 will provide a parallel type electrical connection.

Where, as in Fig. 21, the three arms are each substantially an odd number of quarter wavelengths long, the junction 85 will provide a series type electrical connection.

In some cases it may be preferable, from the standpoint of mechanical convenience, to employ only one type of wave-guide T-junction, i. e., either all E-plane or all H-plane junctions, so that all of their component arms will lie in a common plane. Fortunately, this is, obviously, readily realized by the use of suitable ones of the arrangements shown in Figs. 12 to 14, or 16 to 18, inclusive.

Three elementary low frequency, "lumped-element," constant-resistance networks, well known to those skilled in the art, are shown in Figs. 22, 23 and 24, respectively.

The network of Fig. 22, is, of course, the conventional lattice-type, low frequency, "lumped-element," network and delivers power into the single resistive termination 94, having a value R. The lattice-type network comprises the two series impedances 90, each having a value of $Z_1$ and the two cross-connected shunt impedances 92, each having a value $Z_2$. As is well known to those skilled in the art, the input impedance (at the left of the structure) is R provided that $Z_1Z_2=R^2$. The derivation of a very high frequency, wave-guide, analog of the circuit of Fig. 22 involves, in one form, the use of a wave-guide hybrid junction as is taught, for example, in the copending application of D. H. Ring, Serial No. 68,361, filed December 30, 1948, and assigned to applicant's assignee.

A similar relation is also true for the networks of Figs. 23 and 24, i. e., the input impedance is a pure resistance R provided that $Z_1Z_2=R^2$. In Fig. 23, as shown, impedance 98 has a value of $Z_1$, impedance 96 has a value of $Z_2$ and each of the two resistors 94 has a value of R. Likewise, in Fig. 24, as shown, impedance 100 has a value of $Z_1$, and impedance 102 has a value of $Z_2$ and each of the two resistors 94 has a value of R.

In both Figs. 23 and 24, the two resistors 94 can be regarded as the two output circuits, respectively, of a channel-branching circuit, each being connected for normal operation to an output circuit, or a transmission line, whose characteristic impedance over the frequency region of interest, is a constant resistance having the value R.

$Z_1$ can be an impedance with a broad resonance centered about the mid-frequency of a band of frequencies it is desired to drop, or segregate, and $Z_2$ can be an impedance with a complementary antiresonance centered about the same frequency. Thus, in the circuit of Fig. 23, the band to be dropped will be delivered to the resistive load 94 associated with $Z_1$ (98) and the same band will be reflected, by impedance 96, from the resistive load 94 associated with $Z_2$ (96). All other bands will pass freely through $Z_2$ and be excluded from $Z_1$. Similarly, in the circuit of Fig. 24, resonance of $Z_1$ (100) will, over the frequency band to be dropped, effectively short circuit the upper resistor 94 so that the dropped band will appear across the lower resistor 94, the antiresonance of $Z_2$ (102) over the same band insuring that substantially all energy of the dropped band will appear in the lower resistor 94. At other frequencies $Z_1$ (100) will be a high impedance and $Z_2$ (102) a low impedance so that all other frequency bands will appear across the upper resistor 94.

The derivation of a specific form of microwave, wave-guide analog of the low frequency circuit of Fig. 23 is illustrated by Figs. 25, 26 and 27.

In Fig. 25, an E-plane wave-guade T-junction 82 of Fig. 13 provides a parallel connection for the two symbolically represented, series combinations, comprising impedance 96 in series with resistance 94 and impedance 98 in series with resistance 94, respectively, as shown. The arrangement indicated by Fig. 25 is therefore, clearly of the same general character as that of Fig. 23.

In Fig. 26, the next step in deriving the wave-guide analog of Fig. 23 is shown, and comprises adding two more wave-guide E-plane T-junctions 74, one at the left of the junction 82, and the other at the right of the junction 82, the added E-plane T-junctions providing the desired series connections between the symbolically represented left resistor 94 and impedance 98 ($Z_1$) and between the symbolically represented right resistor 94 and impedance 96 ($Z_2$), respectively, as shown.

In Fig. 27, the final step in deriving a specific form of microwave, wave-guide analog of the low frequency circuit of Fig. 23 is illustrated.

The horizontal section of wave guide 2700, represents, of course, the combination of the three horizontal sections of the three E-plane T-junctions, two of junction 74 and one of junction 82, as indicated.

At the left, the cavity 50 and the associated iris 46 provide an impedance $Z_1$ (see Fig. 5) and the iris is at the upper end of the vertical arm of the left-hand T-junction 74 and is, therefore, at a distance of one-half wavelength from the center line of the horizontal wave-guide section 2700.

At the right, the cavity 50 and associated iris 46 must be supplemented by a quarter wavelength section of wave guide to provide an impedance of $Z_2$ (see Fig. 6), and the right-hand iris is, therefore, at a distance of three-quarters of a wavelength from the center line of the horizontal wave-guide section 2700. The central junction 82, as described above, provides a parallel electrical connection of the left and right-hand portions of the over-all structure.

With a circuit, or a transmission line, having a purely resistive impedance of R, connected to each of the left and right ends of the horizontal section of wave guide 2700, the impedance at the free vertical arm of the center junction 82 will also be R.

It should be understood that the specific mechanical arrangement shown in Fig. 27 is only one of several equally valid and, electrically, fully equivalent arrangements. For example, the cavities 50, etcetera, could equally well be connected to the left and right ends of the section of wave guide 2700 in which instances the vertical arms of the two T-junctions 74 would then be the output terminals. Further alternative mechanical arrangements providing the same electrical effects could be made by turning either or both of the junctions 74 by 90 degrees in the plane of the paper so as to connect the present vertical arm to an arm of junction 82, and then connecting the cavity associated with the junction to either free arm whereupon the other free arm would become the output terminal. Similarly, either junction 74 could be connected to the vertical arm of the central junction 82 and the horizontal arm of junction 82 thus left free would then become the input terminal for all channels.

Figure 28:
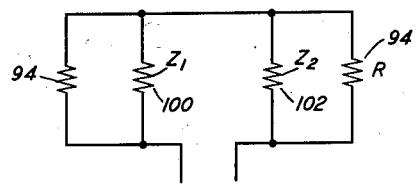
Figure 29:
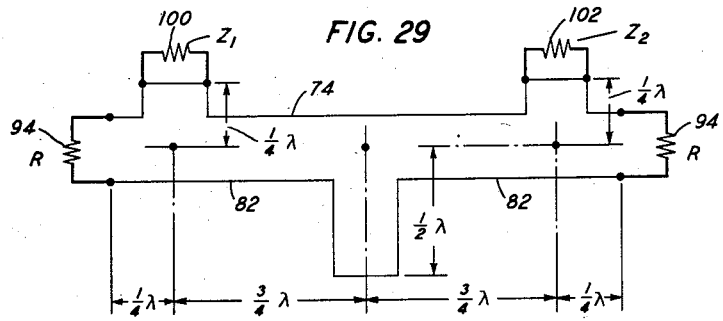

In Fig. 28, the electrical circuit of Fig. 24 has been rearranged, without significant electrical change, to facilitate comparison with the diagram of Fig. 29.

In Fig. 29, we again employ three E-plane wave-guide T-junctions to effect the desired electrical interconnection of the elements in a manner corresponding to that illustrated in the diagram of Fig. 28. In this instance, a series type junction 74 is employed as the central junction with a pair of parallel type junctions 82 to the left and right thereof, respectively. The left-hand parallel type junction 82 serves to effect an electrically parallel connection between the impedance 100 ($Z_1$) and the left-hand resistor 94, the last-mentioned two elements being shown symbolically in Fig. 29. In like manner the right-hand junction 82 serves to effect the electrically parallel connection of impedance 102 ($Z_2$) and the right-hand resistor 94. It is apparent that the structure shown in Fig. 29 is of the same character as that shown in Fig. 28 (and also in Fig. 24).

Figure 30:
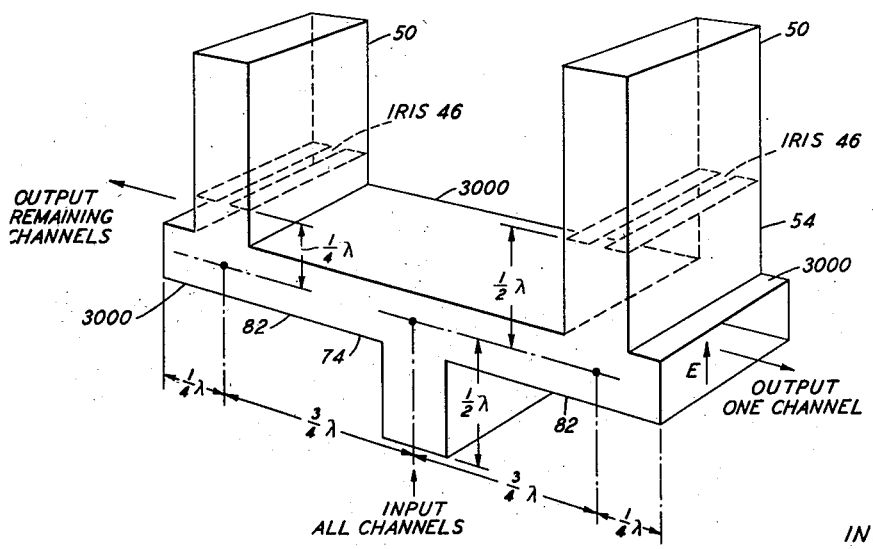

In Fig. 30, the final step in arriving at the microwave wave-guide analog of the standard low frequency circuit of Fig. 24 is illustrated. On the left we again find the cavity 50 with its associated iris 46 providing the impedance $Z_1$ and connecting directly to the vertical one-quarter wavelength arm of the left junction 82. On the right, in order to provide the impedance $Z_2$, we again need to supplement the cavity 50 and its iris 46 by an additional quarter wavelength of wave guide so that the right-hand iris 46 will be at a distance of one-half wavelength from the center line of the horizontal section of wave guide 3000. The section of wave guide 3000 is obviously composed of the horizontal sections of the three above-described wave-guide T-junctions. As in the case of the structure of Fig. 27, that of Fig. 30 is intended for use with a circuit or a transmission line having a purely resistive characteristic impedance of R connected to each end of the horizontal section of wave guide 3000. When so employed, the impedance looking into the vertical arm of the central junction 74 will also be a purely resistive impedance R.

In Fig. 31, a structure which is electrically equivalent to that of Fig. 27 is shown and differs from the structure of Fig. 27 in that H-plane wave-guide T-junctions are employed instead of E-plane wave-guide T-junctions. In Fig. 31, centrally positioned H-plane wave-guide T-junction 76 is employed to afford a parallel connection between the left and right-hand structures of the figure. On the left, an H-plane wave-guide T-junction 78 is employed to effect a series connection between the impedance $Z_1$ provided by cavity 50 and iris 46 and the resistive termination R (which termination will be connected to the left-hand end of horizontal wave-guide section 3100 for normal operation). The iris 46 at the left of the figure will be directly at the end of the vertical arm of the left junction 78 and will, therefore, be at a distance of three-quarters wavelength from the center line or axis of the horizontal wave-guide section 3100. On the right, cavity 50 and iris 46, of course, need to be supplemented by an additional quarter wave section of the wave guide so that the right-hand iris 46 will be at a distance of one wavelength from the center line of the horizontal section of wave guide 3100. The resulting over-all dimensions of the structure, as shown in Fig. 31, will then be one and one-quarter wavelengths between the center point of the central junction 76 and the center points of each of the left-hand and right-hand junctions 78, respectively, with an additional three-quarter wavelength of wave guide from the center points of the left and right-hand junctions 78 to the nearer ends, respectively, of the section of wave guide 3100, as shown. As is well known to those skilled in the art, it is ordinarily permissible to remove one or more half wavelength sections of wave guide from any arm of a wave-guide structure, since the impedances at successive points along a wave guide spaced one-half wavelength apart are usually identical. Applying this principle, the spacing of the right-hand iris 46 from the center line of the section of wave guide 3100 could be reduced to one-half wavelength, and the spacing between the center points of each of the junctions 78 and that of the central junction 76 could be reduced to three-quarters of a wavelength each, and the over-all structure would then still be electrically the equivalent of that shown in Fig. 31. A degree of caution in making such changes must be exercised, however, since, as the spacing between the resonant cavities becomes relatively small, unwanted electrical interaction may be introduced.

In Fig. 32, a third possible form of wave-guide structure equivalent to that shown in Fig. 27 is illustrated and differs from the structure of Fig. 27 only in that an H-plane wave-guide T-junction 76 providing an electrically parallel connection between the left and right portions of the over-all structure is substituted for the E-plane wave-guide T-junction 82 of Fig. 27. This change brings the input arm 302 into the same plane with the main horizontal section of wave guide 3200 resulting from the combination of the horizontal portions of junctions 74 with the "bar," or top, portion of the T-junction 76, as shown.

From the above illustrations, it is obvious that microwave, wave-guide analog structures can be constructed to employ only E-plane T-junctions or only H-plane T-junctions or both E-plane and H-plane T-junctions, so that for any specific purpose a number of mechanically different, but electrically equivalent, structures can readily be devised. Bearing in mind that the numerous variations in the mechanical arrangement of a structure, as suggested in connection with the device of Fig. 27, can also, with equal validity, be applied to any other structure of the invention, it is at once apparent that the present invention offers an extremely wide range and variety of specific mechanical arrangements for any given specific electrical design. Obviously, a form of structure which is both mechanically and electrically suitable for the particular system with which it is to be used will be selected.

Where the impedances $Z_1$ and $Z_2$ are simple, singly resonant structures, such, for example, as those illustrated in Figs. 5 and 6, respectively, the following analysis of the filtering action of structures, such as those shown in Fig. 27 and in Figs. 30 to 32, inclusive, is applicable.

$$Z_1 = j\left(\frac{f-f_o}{f_c-f_o}\right) \quad (1)$$

$$P_T = \frac{1}{1+\left(\frac{f-f_o}{f_c-f_o}\right)^2} P_I \quad (2)$$

$$P_T' = \frac{1}{1+\left(\frac{f_c-f_o}{f-f_o}\right)^2} P_I \quad (3)$$

where $P_I$ = Input power
$P_T$ = Output power of dropped band
$P_T'$ = Output power of all other bands
$f$ = Frequency
$f_o$ = Frequency at band center
$f_c$ = Frequency at a 3 decibels loss point The above transmission characteristics correspond to those obtained from a matched generator connected to a matched load through a singly resonant band-pass filter and a singly resonant band reflection filter, respectively.

The response of microwave, wave-guide, analog structures will be closely similar to the corresponding low frequency "lumped-element" circuits in the vicinity of a central design frequency, such, for example, as the midband frequency for a band-pass or band reflection filter. The response of the wave-guide structure will deviate considerably from that of the corresponding low frequency structure at frequencies far removed from the central design frequency, particularly at very much higher frequencies where higher modes of propagation through the wave-guide structure can occur. However, no deviations of sufficient magnitude to be of any substantial importance have been encountered in the operation of such devices over very broad frequency bands, such, for example, as a band of 500 megacycles having a median frequency in the order of 4000 megacycles.

For many microwave wave-guide filter applications, the characteristics of singly tuned filtering circuits provide to rounded a transmission band and only a gradually increasing loss as the frequency departs from the edge of the transmission band so that, to avoid interference between adjacent frequency bands, the several bands of a system must be widely spaced in frequency. This results in an inefficient use of the frequency range available since with wide spacing large frequency intervals are left between successive transmission bands which cannot be effectively employed.

The classical solution to this difficulty in the low frequency, "lumped-element," wave filter art is the use of multiply resonant filtering structures as taught in numerous textbooks and published articles by such internationally well known authorities as Bode, Cauer, Terman and others. Particular species of such structures are, in fact, described in detail in the above-mentioned Bell System Technical Journal paper by E. L. Norton.

The ultimate in "flat" (substantially uniform loss over the transmitted band) pass-band filters is known as the maximally flat pass-band filter and is the filter which, for a given transmission band of frequencies and a particular given number of resonances in the reactive structure comprising the filter, will have the smallest deviations (and substantially equal deviations) from a constant low loss throughout its transmission band. Similarly, a maximally flat reflection characteristic for a band reflection filter is one which, for a particular reflected band of frequencies and a given number of resonances, will have the smallest deviations from a constant loss over its reflection band.

E. L. Norton in his above-mentioned paper, shows how a pair of low frequency, "lumped-element," networks can be designed which, when connected electrically in parallel, will provide a constant impedance input at the junction and will deliver power to two loads according to supplementary maximally flat band-pass and band reflection characteristics, respectively.

The expression $$P_T = \frac{1}{1+\left(\frac{f-f_o}{f_c-f_o}\right)2N} \quad (4)$$

represents a maximally flat band-pass filter characteristic with N resonances.

The expression $$P_T = \frac{1}{1+\left(\frac{f_c-f_o}{f-f_o}\right)2N} \quad (5)$$

represents a maximally flat reflection filter characteristic with N resonances. The corresponding low frequency, "lumped-element," structures are represented by the electrical schematic diagrams of Fig. 33 and Fig. 37, respectively, of the accompanying drawings (Figs. 3 and 4, respectively, at page 183 of Norton's above-mentioned Bell System Technical Journal paper).

The derivation of very high frequency wave-guide analogs of the circuit represented in Fig. 33 is illustrated in Figs. 34 to 36, inclusive.

In more detail in Fig. 33, the termination into which the filter is designed to operate is a pure resistive load 200, having a value of R. For convenience in calculating a network design, as shown, for example, in Norton's above-mentioned paper, the impedance into which it is to operate is commonly assigned, arbitrarily, the value unity. When the design work has been completed, all impedances are then increased by the ratio of the actual to the assigned value. The series arms for any given total number $n$ of both series and shunt arms, are $A_1Z_1$ for the first series arm 201 at the right end, $A_3Z_1$ for the second series arm 202 from the right end, up to $A_{n-2}Z_1$ and $A_nZ_1$ for the last two series arms 203 and 204, respectively, at the left end of the filter. The shunt arms are from right to left, $$\frac{1}{A_2Z_1}$$

for arm 207 up to $$\frac{1}{A_{n-3}Z_1} \text{ and } \frac{1}{A_{n-1}Z_1}$$

for the last two shunt arms 208 and 209, respectively, at the left end of the filter. $A_1$, $A_2$, etcetera, are, of course, constants indicating the differing absolute values of the respective impedances, all of which have the same variation with frequency, as discussed, for example, hereinabove for the series of constants $K_1$, $K_2$, etcetera. As taught in the above-mentioned Norton paper, the constants are given by the following expressions $$A_1 = \sin \frac{\Pi}{2n} \quad (6)$$

$$A_2 = \frac{\sin \frac{3\Pi}{2n} \sin \frac{\Pi}{2n}}{A_1 \cos^2 \frac{\Pi}{2n}} \quad (7)$$

$$A_m = \frac{\sin \frac{2m-1}{2n}\Pi \sin \frac{2m-3}{2n}\Pi}{A_{m-1} \cos^2 \frac{m-1}{2n}\Pi} \quad (8)$$

$$A_n = n \sin \frac{\Pi}{2n} \quad (9)$$

Expression 8 is a general expression for any constant between $A_2$ and $A_n$, i. e., $m$ can be any integer between 3 and $n-1$, both inclusive.

The network of Fig. 33 is of the general type designated by those skilled in the art as a "ladder" type network for the obvious reason that the alternate series and shunt impedances combine to form a ladder-like structure. It will be obvious to those skilled in the art that the principles and methods of the present invention are directly applicable to the general problem of developing a coaxial line or wave-guide microwave frequency analog of any, low frequency, "lumped-element" ladder-type electrical circuit and are by no means limited to the specific ladder-type structures disclosed in the above-mentioned paper of E. L. Norton. The Norton structures are employed solely for purposes of illustration and because they also provide a solution to the problem of directly obtaining structures comprising paralleled complementary filter pairs, which, by rigorous mathematical proof, have a constant purely resistive impedance.

In Fig. 34 the first step in deriving the microwave, wave-guide analog of the low frequency ladder-type structure of Fig. 33 is shown. In Fig. 33 and subsequent figures involving a substantial number of units, the scale has been reduced by one-half solely for the purpose of reducing the over-all size of the figures and the number of sheets of drawing required. In practice the size of wave guide employed will, of course, be determined by the frequency range over which it is to be used, as explained in detail above. The impedances of the shunt arms 207, 208, 209 of Fig. 33, are each joined to the wave-guide structures through an E-plane T-junction 82 and since each involves the reciprocal of $Z_1$ an associated quarter wavelength, wave-guide section will be required for each as will become apparent in the description of Fig. 35, below. The impedances of the series arms 201, 202, 203, 204 are each joined to the wave-guide structure through an E-plane T-junction 74, directly, that is, they require no associated quarter wavelength sections.

In Fig. 35, the final step in deriving one specific microwave, analog wave-guide structure of the circuit of Fig. 33 is illustrated. The series arms, impedances 201, 202, 203 and 204 are represented simply by cavity 50 with an iris 46 or a modified form thereof, as indicated by the designation numbers 46", $46^{n-2}$ and $46^n$. The shunt impedances 207, 208 and 209 each require a quarter wavelength of wave guide in addition to the cavity 50 and modified irises, the latter being indicated by designation numbers 46', $46^{n-3}$, and $46^{n-1}$, respectively, as shown, the series impedances being joined to the main horizontal section of wave guide 3500 by their respective associated junctions 74. All have their associated irises at a distance of one-half wavelength from the center line of the main horizontal wave-guide section. The shunt impedances, although connected to the main horizontal section of wave guide 3500 by their respective associated T-junctions 82, have their respective irises at a distance of one-half wavelength from the center line of the horizontal wave guide 3500 after the necessary quarter wavelength section of wave guide has been added to them, as described above. The spacing, center to center, between adjacent cavities turns out to be three-quarters of a wavelength in each instance and the two ends of the horizontal section of wave guide 3500 are normally one-half wavelength from the center line of the nearest cavity. As taught in the above-mentioned Norton paper and as will become apparent hereinunder, the band reflection filter of Fig. 35 is designed to be used with its left or input end connected in parallel with the input end of a band-pass filter of complementary design, the latter filter passing the band of frequencies which is reflected by the filter of Fig. 35.

The structure of Fig. 36 is electrically equivalent to that of Fig. 35 and differs therefrom only in that H-plane wave-guide T-junctions 76 and 78 have been substituted for the corresponding E-plane wave-guide T-junctions 82 and 74, respectively. The irises of all the impedances in the structure of Fig. 36 are located at a distance of three-quarters of a wavelength from the center line of the main section of horizontal wave guide 3600. The spacings, center to center, between adjacent impedances turn out to be five-quarters of a wavelength, each, with the input and output ends, that is, the left and right ends, respectively, of the main section of wave guide 3600, each at three-quarters of a wavelength from the center line of the nearest cavity. As has been previously mentioned, it is theoretically permissible to add or subtract half wavelength sections of wave guide where this can be done without incurring objectionable mechanical difficulties or electrical interactions between adjacent elements. In the case of the structure of Fig. 36, it is, in general, entirely practicable to reduce the five-quarter wavelength spacings to three-quarters of a wavelength and thus to substantially shorten the over-all structure. As shown on the drawing, the cavities and irises for the structure of Fig. 36 are identical with the corresponding ones of Fig. 35.

A third alternative mechanical structure, electrically equivalent to those of Figs. 35 and 36 can obviously be arrived at by employed E-plane T-junction 74 to connect the series arms and H-plane T-junctions 76 to connect the parallel, or shunt, arms of the ladder structure analog.

The very high frequency, or microwave, wave-guide anolag of the low frequency, "lumped-element." ladder-type structure shown in electrical schematic diagram form in Fig. 37 can be derived in the same general manner as described above in connection with Fig. 35.

In Fig. 37, a design of band-pass filter, which is complementary to that illustrated in Fig. 33 described above, is shown and will be found to correspond to the design shown in Fig. 4 of the above-mentioned paper of E. L. Norton. The terminating impedance 200 again has a purely resistive value of R. In this instance the series arms 330, 331, 332 and 333 are all found to involve the reciprocal of the impedance $Z_1$ whereas the shunt arms 335, 336 and 337 do not.

Proceeding as in the case of Fig. 35 described above, each series arm is connected to the main horizontal section of wave guide 3800 by an E-plane wave-guide T-junction 74 and each shunt arm is connected to wave-guide section 3800 by a T-junction 82. The series arms, since they involve the reciprocal of impedance $Z_1$, each require an additional quarter wavelength of wave guide so that the irises of the series arms will all be at a distance of three-quarters of a wavelength from the center line of the section of wave guide 3800. The shunt arms will connect directly to the vertical arm of their respective T-junctions and will thus all have their irises at a ditsance of one-quarter wavelength from the center line of the wave-guide section 3800. The spacing center to center between adjacent cavities for Fig. 38 will again be three-quarters of a wavelength and the ends of the main section of wave guide 3800 will each be at a distance of one-half wavelength from the vertical center line of the nearest cavity.

In Fig. 39, a structure electrically equivalent to that of Fig. 38, but substituting H-plane wave-guide T-junctions 76 and 78 for the corresponding E-plane wave-guide T-junctions 82 and 74, respectively, of Fig. 38, is shown. In Fig. 39, the series arm cavities will have their irises at a distance of one wavelength from the center line of the main section of wave guide 3900, and the shunt arm cavities all have their irises at a distance of one-half wavelength. The spacings between adjacent cavities are five-quarters of a wavelength as for the structure of Fig. 36. In the structure of Fig. 39, one-half wavelength sections can be omitted between cavities center to center and also between the irises of the series arms and the center line of the section of wave guide 3900 so that all cavities can have their irises at a distance of one-half wavelength from the center line of the main section of wave guide 3900. Again we find that the cavity and iris combinations for the structure of Fig. 39 can be identical with the corresponding ones of Fig. 38.

In Fig. 40 are shown a band reflection microwave wave-guide filter 4004 and a complementary band-pass microwave wave-guide filter 4002, the latter passing the frequency band which is reflected by the former. Filter 4004 is of the type described above in connection with Figs. 33 to 35, inclusive. It differs therefrom only in that it has three sections instead of $n$ sections. Filter 4002 is of the type described above in connection with Figs. 37 and 38, but, also, differs therefrom in having three sections instead of $n$ sections. The input ends of the two filters 4004 and 4002 are connected electrically in parallel by the centrally located T-junction 82.

Since these filters have three sections each, $n=3$ and from Formulae 6 through 9 above, the constants are as follows:

$$A_1 = \sin \frac{\Pi}{6} = \sin 30° \tag{10}$$

$$A_2 = \frac{\sin \frac{\Pi}{2} \sin \frac{\Pi}{6}}{\sin \frac{\Pi}{6} \cos^2 \frac{\Pi}{6}} = \frac{\sin 90°}{\cos^2 30°} = \frac{1}{\cos^2 30°} \tag{11}$$

$$A_3 = 3 \sin \frac{\Pi}{6} = 3 \sin 30° \tag{12}$$

From Fig. 35 cavity and iris combinations 412, 413 and 414 are, respectively, $A_1 Z_1$; $A_2 Z_1$ and $A_3 Z_1$ or $Z_1 \sin 30°$;

$$\frac{Z_1}{\cos^2 30°}$$

and $3Z_1 \sin 30°$, respectively.

From Fig. 38, cavity and iris combinations 422, 421 and 420 are, respectively, $$\frac{A_1}{Z_1}; \frac{A_2}{Z_1} \text{ and } \frac{A_3}{Z_1} \text{ or } \frac{\sin 30°}{Z_1}; \frac{1}{Z_1 \cos^2 30°} \text{ and } \frac{3 \sin 30°}{Z_1}$$

respectively. (It should be noted that the constants $A_1$, $A_2$, $A_3$ etcetera depend upon the number of elements or sections "$n$.")

The irises 46, 46', 46", 446, 446' and 446" are adjusted as described hereinabove to obtain the desired impedance in each instance.

As for all filters of the class being described, $Z_1 Z_2 = R^2$ and with each of the output terminals 402 and 404 connected to a load having a purely resistive impedance of the value R, the input impedance at input terminal 400 will also be a purely resistive impedance of the value R. If a main wave-guide transmission line, transmitting a plurality of very high frequency intelligence signal channels, such as video signal channels, is connected to input 400, a single signal channel corresponding to the frequency pass-band of the band-pass filter will be transmitted to output 402 and the remainder of the signal channels will be transmitted to output 404 whence they can be passed through other structures of the type illustrated by Fig. 40 but designed to segregate, or drop, different other single signal bands of frequencies or channels of the system, in accordance with the general plan illustrated by Fig. 2 described above, until all signal frequency bands or channels have been segregated.

Filters providing maximally flat transmission characteristics, such as those described above in connection with Figs. 36, 39 and 40, do not always provide adequate discrimination against wave energy which may be present in a particular system having frequencies near the uppermost and lowermost frequencies of the frequency band to be segregated.

The answer to the above problem, in low frequency, "lumped-element," filter design, is to provide a type of filter which will have peaks of attenuation near the outermost upper and/or lower edges of the frequency band to be segregated. One form of such a filter is known as the M-derived filter which is, for example, described in detail at pages 244 to 277, inclusive, in the book entitled "Transmission Networks and Wave Filters" by T. E. Shea, published by D. Van Nostrand Co., Inc., New York City, 1929.

A complementary pair of M-derived filters, which combine to form an over-all constant-resistance structure with like reflection and pass, frequency bands, respectively, are shown in Figs. 5 and 6 of E. L. Norton's above-mentioned Bell System Technical Journal paper at page 187.

Fig. 41 is, obviously, an electrical schematic diagram of the combination of a complementary pair of filters of the type just mentioned above, in which each filter comprises two, single element, series arms and an intermediate two element shunt, or parallel, arm.

In more detail, the band-pass filter comprises the four elements 505, 506, 507 and 508 having the values $$\frac{A_1}{Z_1}; \frac{A_3}{Z_1}; \frac{Z_1}{A_2}$$

and $$\frac{K}{Z_1}$$

respectively, as taught by Norton's above-mentioned paper. The constants $A_1$; $A_2$ and $A_3$ are obtained from Equations 6 to 9, inclusive, given above.

The constant $$K = \frac{P_1^2}{A_2}$$

where $P_1$ is obtained from the general equations for the over-all structure, as taught in the above-mentioned paper by E. L. Norton at pages 184 through 188, inclusive.

Similarly, the band reflection filter comprises the four elements 510, 511, 512 and 513 having the values $$A_3 Z_1; A_1 Z_1; \frac{1}{A_2 Z_1}$$

and $K Z_1$, respectively. The constants $A_1$; $A_2$; $A_3$ and K are, of course, the same as for the above-described band-pass filter.

The derivation of one specific, very high frequency, (microwave) wave-guide analog of the structure represented schematically by Fig. 41 is illustrated by Figs. 42, 43 and 44.

In Fig. 42, the first step in deriving one specific form of microwave, wave-guide analog of the circuit shown schematically in Fig. 41 is given. The main horizontal section of wave guide 4200 is again composed of the horizontal portions of a plurality of E-plane wave-guide T-junctions 74 and 82 occurring alternately with junctions 74 being employed to connect the series arms 505, 506, 510 and 511 to the main section of guide 4200 and junctions 82 being employed to connect the shunt arms comprising the combinations 507, 508, and 512, 513 to the main section of guide 4200 and an additional centrally located junction 82 being employed to connect the inputs of the left and right sections of the over-all structure electrically in parallel. Since each of the shunt arms comprises two impedances which must be connected electrically in series, two additional junctions 74 are employed to effect the desired connection between the elements 507 and 508 and between the elements 512 and 513 of the two shunt arms, respectively, as shown.

In Fig. 43, the final step in deriving the specific waveguide analog of the circuit of Fig. 41 is shown. In order to avoid mechanical interference, the two junctions 74 employed to connect the impedances 506 and 511, respectively, to the main section of wave guide 4300 have been turned through 180 degrees, as shown in Fig. 43. As taught above, it would also be entirely permissible and practical to substitute the equivalent H-plane T-junction 78 for junction 74 in the two instances noted, which would cause the resonators providing impedances 506 and 511 to be, in effect, turned 90 degrees and thus avoid the mechanical difficulty described.

The first series impedance 505 at the extreme left of the structure involves the reciprocal of $Z_1$ and, therefore, requires a one-quarter wavelength section of wave guide in addition to the cavity and iris so that the iris for this impedance is located at a distance of three-quarters of a wavelength from the center line of the main section of wave guide 4300.

The impedances 507 and 508 are, as shown, first connected electrically in series by a junction 74 and since impedance 508 involves the reciprocal of $Z_1$, an additional quarter wavelength section of wave guide is interposed between the iris of the cavity providing this impedance and the vertical center line of its associated junction 74 so that the iris for this impedance is located at a distance of three-quarters of a wavelength from said center line. The horizontal center line of this junction 74 is, as shown, located at a distance of three-quarters of a wavelength from the center line of the main horizontal section of wave guide 4300 and the cavity providing impedance 507 has its iris located at a distance of one-half wavelength from the horizontal center line of its associated junction 74.

Impedance 506, involving the reciprocal of $Z_1$, has its iris located at a distance of three-quarters of a wavelength from the center line of the main section of guide 4300.

The assembly of impedances 510, 511, 512 and 513 at the right in Fig. 43 is effected in a similar manner, as is quite obvious from the drawing.

The vertical arm of the central junction 82 then serves as the input terminal of the structure and the left and right ends of the main horizontal section of wave guide 4300 serve as output terminals, one channel passing through the band-pass filter on the left and appearing at the left output terminal, the remaining channels passing through the band reflection filter at the right and appearing at the right output terminal. The horizontal spacing between the mid-points of the consecutive T-junctions is, as shown, three-quarters of a wavelength in each instance, and the output terminals are at a distance of one-half wavelength from the center point of their respective end T-junctions. The individual irises for each of the impedances required by the structure of Fig. 43 are, of course, adjusted in size, as described above, to provide the proper impedance lever in each particular instance.

In Fig. 44A, a coaxial line resonator 4450, having a length of substantially one-half wavelength, its right end being short-circuited and its left end being provided with an iris 4446, is shown and is one specific form of coaxial line counterpart for the wave-guide resonator of Fig. 5 and can, over an appropriate range of frequencies, simulate the electrical properties of the low frequency, "lumped-element," combination represented schematically in Fig. 4. In general, coaxial line structures are conveniently used at frequencies sufficiently high that conventional "lumped-element" structures become impracticable but which are, on the other hand, somewhat lower than those at which wave-guide structures of reasonable mechanical dimensions can be readily constructed. There is, however, a substantial range of frequencies over which either coaxial or wave-guide structures can be conveniently employed.

Figure 44B:
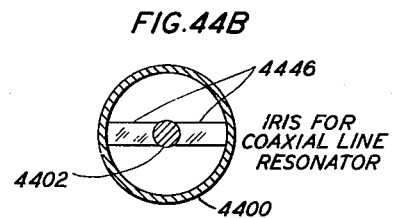
Figure 44C:
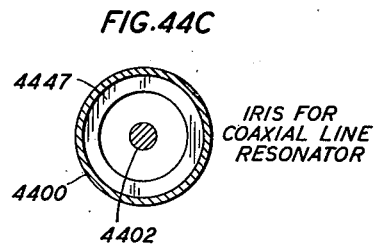
Figure 44D:
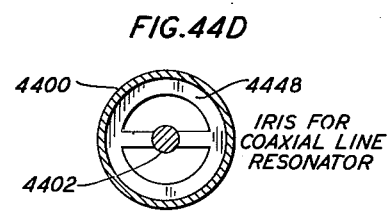

Figs. 44B, 44C and 44D represent three types of irises which may be employed with coaxial line resonators of the type shown in Fig. 44A. In Fig. 44B, the iris comprises a rod or plate 4446 extending diametrically across the outer conductor 4400 and including a section of the inner conductor 4402. As a practical matter, it will ordinarily be made in two parts, one on each side of the inner conductor 4402 extending from the outer surface of said inner conductor to the inner surface of the outer conductor. The impedance introduced by this type of iris is determined by its thickness, i. e., its vertical dimension, as shown in Fig. 44B. The type of iris illustrated by Fig. 44B accentuates the inductive reactance of the cavity with which it is used.

In Fig. 44C, a second type of iris for use with resonators of the type illustrated in Fig. 44A is shown and comprises an annular ring or conductive washer 4447 interposed between the inner conductor 4402 and the outer conductor 4400 so as to partially close the opening between the two conductors. This type of iris accentuates the capacitative reactance of the structure with which it is associated.

In Fig. 44D, an iris 4448 combining the features of the iris 4446 and 4447 is shown and is mechanically, as well as electrically, a combination of the two, as is apparent from Fig. 44D. As shown it includes an annular portion similar to iris 4447 and a diametrically disposed portion similar to 4446, the assembled structure being positioned between the inner conductor 4402 and the outer conductor 4400, as shown.

Figure 45:
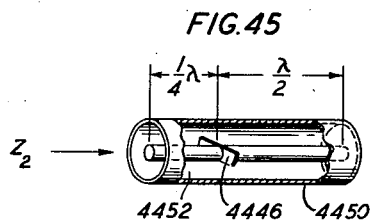

Assuming that the resonator shown in Fig. 44A has an impedance, looking into its left end, of $Z_1$, as indicated in Fig. 44A, the reciprocal of this impedance, designated $Z_2$, can be obtained in the same manner as for the waveguide resonator of Fig. 5, i. e., by simply adding a quarter wavelength of coaxial transmission line 4452 to the resonator of Fig. 44A so that in Fig. 45 the structure will present an impedance of $Z_2$ at the left end of the section 4452. As in the case of the wave-guide structures $$Z_1 Z_2 = R^2$$

The resonators of Fig. 44A and Fig. 45 can be combined with the coaxial line T-junctions of Figs. 19, 20 and 21 in precisely analogous ways as the wave-guide resonators of Figs. 5 and 6 were combined with the waveguide T-junctions of Figs. 11 through 18, inclusive, as described in detail above. Two specific illustrations of the general method as applied to coaxial line structures are given in Figs. 46 and 47 from which the complete analogy with corresponding wave-guide structures is at once apparent.

Figure 46:
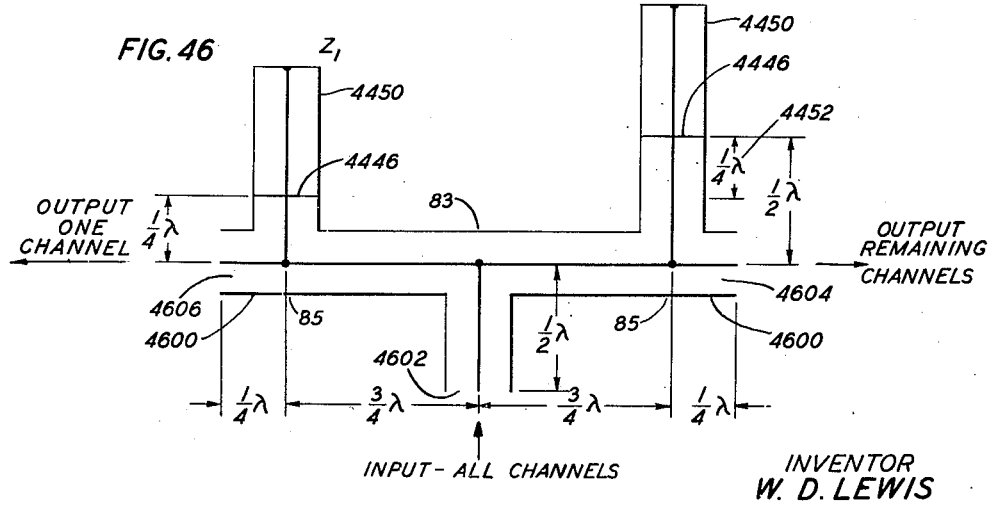

In Fig. 46, the coaxial line equivalent of the wave-guide branching filter of Fig. 27, described in detail above, is shown. It comprises a central coaxial line T-junction 83 of Fig. 20 with a coaxial line T-junction 85 joined to each of the left and right arms of the junction 83, as shown in the figure. The right-hand junction 85 provides a series connection between the resonator 4450 and iris 4446 combination and a terminal impedance having a value R which will for normal operation of the structure be connected to the left terminal 4606 of the over-all structure. Since an impedance of $Z_1$ is desired at the left of the structure of Fig. 46, the iris 4446 will be at a distance of one-quarter wave-length from the center line of the main horizontal portion of coaxial line 4600. Similarly, on the right, cavity 4450, iris 4446 and one-quarter wavelength of coaxial line section 4452 provide an impedance of $Z_2$ connecting to the vertical arm of the hight-hand T-junction 85, iris 4446 being at a distance of one-half wavelength from the center line of the main horizontal section of coaxial line 4600. The central junction 83, of course, provides an electrically parallel connection between the left and right-hand sections of the structure described above, so that the lower end of the vertical arm 4602 of the junction 83 provides a common input terminal for the structure. With a plurality of channels introduced into the input terminal 4602, one channel determined by the band-pass characteristic of the left-hand section of the structure will pass out the left terminal 4606 thereof. The remaining channels will, of course, pass out the right terminal 4604.

The coaxial line structure of Fig. 47 is obviously the counterpart of the wave-guide structure of Fig. 43, the differences in dimensions, where they occur, being necessitated by the differences in the dimensions of the T-junctions. Impedances 710, 712, 714, 716, 718, 720, 722, and 724 of Fig. 47 correspond, respectively, to impedances 505, 507, 508, 506, 510, 512, 513 and 511 of Fig. 43. Input 700 of Fig. 47 corresponds to input 600 of Fig. 43, and output terminals 702 and 704 of Fig. 47 correspond to output terminals 602 and 604, respectively, of Fig. 43. The over-all horizontal dimensions of the structure of Fig. 47 are identical, in terms of wavelength, with those of Fig. 43, except that the output terminals are located at a distance of one-quarter wavelength instead of one-half wavelength from the center point of their nearest respective T-junctions. Also, the input terminal of the structure of Fig. 47 is at a distance of one-half wavelength from the center line of the horizontal section of coaxial line 4700, whereas the input terminal 600 of Fig. 43 is at a distance of one-quarter wavelength from the center line of the horizontal section of wave guide 4300.

In all of the above-described structures, T-type junctions, having one arm at an angle of 90 degrees with respect to the other two, have been employed. Other types of junctions having three arms joining at angles other than 90 degrees can obviously be employed, one such junction, for example, being shown and described in detail in my Patent 2,531,447, granted November 28, 1950. For any such junction where particular lengths of the respective arms of the junction are found to provide a true series or parallel electrical connection, as defined above for T-type junctions, the other type of connection, i. e., parallel or series, respectively, can be realized by adding substantially a quarter wavelength to the length of each arm of the structure.

The above-described examples illustrate the application of the principles of the invention to the design of a few specific illustrative structures. Those skilled in the art can readily appreciate that the principles provide a very broad basis for deriving a multiplicity of very high frequency (or microwave) waveguide and/or coaxial structures which can take any of numerous and varied forms and will be, over wide operating frequency ranges, faithful analogs of the low frequency, "lumped-element," structures from which they are derived. It is accordingly obvious that those skilled in the art can readily devise numerous and varied other structures embodying the principles of the invention and clearly within the scope thereof.

What is claimed is:

1. A very high frequency, electromagnetic wave, shielded transmission line, analog of a low frequency, "lumped-element," ladder-type, electrical network, said network comprising a plurality of low frequency, "lumped-element," impedance electrically connected, alternately, in series and in shunt, respectively, said analog comprising a like plurality of serially connected shielded transmission line T-junctions, said T-junctions being, alternately, of the electrical series connection, and of the electrical parallel connection types, respectively, all of said T-junctions being formed of the same uniform size and type of shielded transmission line, each of said T-junctions having all three arms of equal length, said length being an integral number of quarter wavelengths of the median frequency of the frequency band with which the over-all structure is to be used and a like plurality of shielded transmission line impedance elements, each element simulating at said very high frequency a different one of said plurality of low frequency impedances, each shielded transmission line impedance element being electrically connected to an arm of a different one of said plurality of T-junctions, elements simulating low frequency, series connected impedances being connected to the arms of the T-junctions of the electrically series connection type, elements simulating low frequency shunt connected impedances being connected to the arms of the T-junctions of the electrically parallel connection type, said elements being arranged in the same order as that of the corresponding low frequency impedances of said electrical network which they, respectively, simulate.

2. The analog of claim 1, in which all the T-junctions are wave-guide T-junctions and the very high frequency impedance elements are sections of wave guide with approximately located shorting and iris members assembled therein.

3. The analog of claim 1, in which all the junctions are E-plane wave-guide T-junctions and the very high frequency impedance elements are sections of rectangular hollow wave guide with appropriately located shorting and iris members assembled therein.

4. A first structure as defined in claim 1, having a predetermined band-pass transmission characteristics, a second structure as defined in claim 1, having a predetermined band reflection characteristic coinciding in frequency with the pass-band of said first structure and a shielded transmission line T-junction interconnecting the input terminals of said first and said second structures.

5. A very high frequency electromagnetic wave, shielded-type transmission line structure comprising a plurality of shielded-type transmission line T-junctions, all of said junctions being formed of the same uniform size and type of shielded transmission line, each of said T-junctions having all three arms of equal length, said length being an integral number of quarter wavelengths of the median frequency of the frequency band with which the over-all structure is to be used, a first portion of said T-junctions each providing at its third arm an electrical series-type connection of two impedances connected to any two arms of the junction, respectively, a second portion of said T-junctions each providing at its third arm an electrical parallel-type connection of two impedances connected to any two arms of the junctions, respectively, said plurality of T-junctions being connected electrically in cascade relation and a plurality of shielded-type transmission line impedance devices, each impedance device having a predetermined impedance versus frequency characteristic over said frequency band and being connected electrically to an arm of a particular one of said T-junctions, the number of impedance devices not exceeding the number of T-junctions, whereby very high frequency electromagnetic wave energy, within said frequency band, introduced into a first free arm of said over-all structure will be transmitted to other free arms of said structure subject to predetermined frequency discriminative effects introduced by said over-all combination of structure.

6. The structure of claim 5, in which all of the T-junctions are wave guide T-junctions of the E-plane type.

7. The structure of claim 5, in which all of the T-junctions are wave-guide T-junctions of the H-plane type.

8. The structure of claim 5, in which a portion of the T-junctions are wave-guide T-junctions of the E-plane type and the remainder are wave-guide T-junctions of the H-plane type.

9. The structure of claim 5, in which all of the T-junctions are coaxial line T-junctions.

10. A structure in accordance with claim 5, in which three T-junctions are connected in cascade relation, one end T-junction having a microwave impedance of value $Z_1$ connected to one of its arms, the other end junction having a microwave impedance of value $Z_2$ connected to one of its arms, where $Z_1$ and $Z_2$ are related in accordance with the equality $Z_1Z_2=R^2$, where R is a predetermined constant purely resistive impedance.

11. The structure of claim 10, in which the T-junctions are E-plane wave-guide T-junctions.

12. The structure of claim 10, in which the T-junctions are H-plane wave-guide T-junctions.

13. The structure of claim 10, in which a portion of the T-junctions are E-plane wave-guide T-junctions and the remainder are H-plane wave-guide T-junctions.

14. A structure in accordance with claim 5, in which of the plurality of T-junctions connected in cascade relation, one arm of a centrally located T-junction constitutes an input terminal, one arm of each end T-junction constitutes an output terminal and one arm of each of said T-junctions except said centrally located T-junction has a shielded-type transmission line impedance device connected thereto, the values of said impedance devices between one end junction and said central junction being proportioned in accordance with the series $A_1Z_1$;

$$\frac{1}{A_2Z_1}; A_3Z_1 \ldots ; \frac{1}{A_{n-1}Z_1}$$

the values of said impedance devices between the other end junction and said central junction being proportioned in accordance with the series $$\frac{A_1}{Z_1}; \frac{Z_1}{A_2}; \frac{A_3}{Z_1}; \ldots ; \frac{Z_1}{A_{n-1}}; \frac{A_n}{Z_1}$$

where the constants $A_1, A_2, \ldots A_n$ are defined by the relations $$A_1 = \sin \frac{\Pi}{2n}$$

$$A_2 = \frac{\sin \frac{3\Pi}{2n} \sin \frac{\Pi}{2n}}{A_1 \cos^2 \frac{\Pi}{2n}}$$

$$A_m = \frac{\sin \frac{2m-1}{2n}\Pi \sin \frac{2m-3}{2n}\Pi}{A_{m-1} \cos^2 \frac{m-1}{2n}\Pi}$$

$$A_n = n \sin \frac{\Pi}{2n}$$

where $m$ is any integer between 3 and $n-1$, inclusive.

15. A structure in accordance with claim 5, in which the alternate T-junctions are of the electrical series-connection type and the intermediate T-junctions are of the electrical parallel-connection type.

16. A structure in accordance with claim 15, in which the T-junctions are wave-guide E-plane T-junctions.

17. A structure in accordance with claim 15, in which the T-junctions are wave-guide H-plane T-junctions.

18. A structure in accordance with claim 15, in which a portion of the T-junctions are E-plane T-junctions and the remainder are H-plane T-junctions.

19. A structure in accordance with claim 15, in which the T-junctions are coaxial line T-junctions.

20. A structure in accordance with claim 5, in which of the plurality of T-junctions connected in cascade relation, one arm of a centrally located T-junction constitutes an input terminal, one arm of each end T-junction constitutes an output terminal, and one arm of each of said T-junctions except said centrally located T-junction has a shielded-type transmission line impedance device connected thereto, the portions of said over-all structure to one side and the other side, respectively, of said centrally located T-junction presenting at their respective connections to said centrally located T-junction impedances conforming to the relation $Z_1Z_2=R^2$, where R is a purely resistive impedance of predetermined fixed value and $Z_1$ and $Z_2$ are the impedances of the said two portions of the over-all structure, respectively.

References Cited in the file of this patent

UNITED STATES PATENTS

| | | |
|---|---|---|
| 2,421,033 | Mason | May 27, 1947 |
| 2,479,697 | Norton | Aug. 23, 1949 |
| 2,548,672 | Lewis | Apr. 10, 1951 |
| 2,588,226 | Fox | Mar. 4, 1952 |

FOREIGN PATENTS

| | | |
|---|---|---|
| 609,231 | Great Britain | Sept. 28, 1948 |
| 976,056 | France | Oct. 25, 1950 |